US010352741B2

(12) United States Patent
Kannan et al.

(10) Patent No.: US 10,352,741 B2
(45) Date of Patent: Jul. 16, 2019

(54) FLOW RATE MEASUREMENT METHOD AND APPARATUS

(71) Applicant: Japan Aerospace Exploration Agency, Tokyo (JP)

(72) Inventors: Hiroki Kannan, Tsukuba (JP); Shusuke Hori, Tsukuba (JP); Hideaki Nanri, Tsukuba (JP); Masaharu Uchiumi, Tsukuba (JP); Yoshiki Yoshida, Tsukuba (JP)

(73) Assignee: Japan Aerospace Exploration Agency, Tokyo (JP)

( * ) Notice: Subject to any disclaimer, the term of this patent is extended or adjusted under 35 U.S.C. 154(b) by 597 days.

(21) Appl. No.: 14/514,304

(22) Filed: Oct. 14, 2014

(65) Prior Publication Data

US 2015/0112614 A1    Apr. 23, 2015

(30) Foreign Application Priority Data

Oct. 18, 2013    (JP) .................................. 2013-217695

(51) Int. Cl.
*G01F 1/00* (2006.01)
*G01F 1/05* (2006.01)
(Continued)

(52) U.S. Cl.
CPC .................. *G01F 1/00* (2013.01); *G01F 1/05* (2013.01); *G01F 1/667* (2013.01); *G01F 1/668* (2013.01); *G01F 15/02* (2013.01)

(58) Field of Classification Search
None
See application file for complete search history.

(56) References Cited

U.S. PATENT DOCUMENTS 3,188,862 A * 6/1965 Roth ...................... G01F 1/665
73/861.02
3,283,574 A * 11/1966 Roth ...................... G01F 1/665
307/650
(Continued)

FOREIGN PATENT DOCUMENTS

EP    2228631 A1 *  9/2010 ............. G01F 1/667
EP    2863187 A2 *  4/2015
(Continued)

OTHER PUBLICATIONS

14514304 STIC Search Report (Year: 2018).*
(Continued)

*Primary Examiner* — Janet L Suglo
*Assistant Examiner* — Leonard S Liang
(74) *Attorney, Agent, or Firm* — McDermott Will & Emery LLP

(57) ABSTRACT

Method and apparatus capable of accurately measuring a flow rate using Gaussian quadrature even under a small number of measurement points are provided. An average for the y-coordinate of values of normal-directional component with respect to the cross-section represented by $v_{z0}(x, y)$ among an estimated flow velocities in a flow passage cross-section is used as $V_{z0}(x)$, and a weighting function of Gaussian quadrature is set to $V_{z0}(x)L(x)$, where $L(x)=y_{max}(x)-y_{min}(x)$. Further, an average for y of values of normal-directional component with respect to the cross-section of an actual flow velocity represented by $v_z(x, y)$ is used as $V_z(x)$, and an integrand is set to $V_z(x)/V_{z0}(x)$. These values are used to determine an approximate value of a flow rate according to Gaussian quadrature. In addition, a method of virtually offsetting zero-point of the flow velocity distribution to apparently avoid a problem such as reverse flow is provided.

16 Claims, 8 Drawing Sheets

(51) Int. Cl.
*G01F 1/66* (2006.01)
*G01F 15/02* (2006.01)

(56) References Cited

U.S. PATENT DOCUMENTS

| | | | | |
|---|---|---|---|---|
| 3,564,912 | A * | 2/1971 | Malone et al. | G01F 1/668 73/861.31 |
| 3,841,568 | A * | 10/1974 | Broad | F15D 1/065 138/39 |
| 3,940,985 | A | 3/1976 | Wyler | |
| 4,109,523 | A | 8/1978 | Tessandier | |
| 4,300,401 | A * | 11/1981 | Pedersen | G01F 1/666 700/282 |
| 4,317,178 | A | 2/1982 | Head | |
| 4,336,719 | A * | 6/1982 | Lynnworth | G01F 1/667 73/861.27 |
| 4,557,148 | A * | 12/1985 | Akiyama | G01F 1/667 702/48 |
| 4,748,857 | A * | 6/1988 | Nakagawa | G01F 1/66 73/861.28 |
| 4,754,650 | A * | 7/1988 | Smalling | G01F 1/662 73/861.28 |
| 4,856,321 | A * | 8/1989 | Smalling | G01F 1/662 73/40.5 A |
| 5,597,962 | A * | 1/1997 | Hastings | G01F 1/662 374/E11.01 |
| 5,741,980 | A * | 4/1998 | Hill | G01B 5/28 73/861.04 |
| 6,502,465 | B1 * | 1/2003 | Vedapuri | G01F 1/66 73/861.04 |
| 6,694,824 | B2 * | 2/2004 | Shinmura | G01F 1/662 73/861.29 |
| 6,748,811 | B1 * | 6/2004 | Iwanaga | G01F 1/662 73/861.18 |
| 6,782,326 | B2 | 8/2004 | Takamoto et al. | |
| 6,837,113 | B1 * | 1/2005 | Freund, Jr. | G01F 1/662 73/861.18 |
| 2001/0010031 | A1 | 7/2001 | Takamoto et al. | |
| 2002/0178836 | A1 * | 12/2002 | Shinmura | G01F 1/662 73/861.29 |
| 2004/0011141 | A1 * | 1/2004 | Lynnworth | G01F 1/662 73/861.27 |
| 2008/0059085 | A1 * | 3/2008 | Simon | G01F 1/66 702/48 |
| 2008/0134798 | A1 * | 6/2008 | Li | G01F 1/663 73/861.25 |
| 2015/0160052 | A1 * | 6/2015 | Wiest | G01F 1/662 73/861.27 |
| 2015/0292927 | A1 * | 10/2015 | Satou | G01F 1/66 73/861.29 |

FOREIGN PATENT DOCUMENTS

| | | | | |
|---|---|---|---|---|
| JP | 51-129261 | A | | 11/1976 |
| JP | 58070132 | A * | 4/1983 | G01F 1/667 |
| JP | 62062218 | A * | 3/1987 | |
| JP | 2001056244 | A * | 2/2001 | |
| JP | 2001-208584 | A | | 8/2001 |
| JP | 2007152074 | A * | 6/2007 | |
| JP | 2011235009 | A * | 11/2011 | |
| JP | 2012220465 | A * | 11/2012 | |
| JP | WO2013051272 | A1 * | 3/2015 | G01F 1/662 |
| JP | 2015-078962 | A * | 4/2015 | |
| KR | 20060014521 | A * | 2/2006 | |
| RU | 2347102 | C1 * | 2/2009 | |

OTHER PUBLICATIONS

Machine Translation for JP2007152074 (Year: 2007).*
Machine Translation for JP2011235009 (Year: 2011).*
Machine Translation for JP2012220465 (Year: 2012).*
Machine Translation for JPS5870132 (Year: 1983).*
Machine Translation for JPS6262218 (Year: 1987).*
Machine Translation for JPWO2013051272 (Year: 2013).*
Machine Translation for KR20060014521 (Year: 2006).*
Machine Translation for RU2347102 (Year: 2007).*
Salami, et al., "Applicaton of a computer to asymmetric flow measurement in circular pipes," Trans Inst M C, Sep. 1984, pp. 197-206, vol. 6, No. 4.
Bryant, et al., "An uncertainty analysis of mean flow velocity measurements used to quantify emissions from stationary sources," Journal of the Air & Waste Management Association, Jun. 2014, pp. 679-689, vol. 64, No. 6.
Mandard, et al., "Transit Time Ultrasonic Flowmeter: Velocity Profile Estimation," Sep. 2005, 2005 IEEE Ultrasonics Symposium, pp. 763-766.

* cited by examiner

CROSS SECTION X

FLOW RATE MEASUREMENT METHOD AND APPARATUS

TECHNICAL FIELD

The subject technology relates to a method and apparatus for measuring a flow rate with a high degree of accuracy in a flow passage having difficulty in sufficiently achieving flow-straightening, typically in a liquid rocket engine or other ground testing facilities, and the like.

BACKGROUND

Generally, a volume flow rate can be defined as a volume of a fluid flowing through a flow passage cross-section within a time unit. For example, a flow rate Q of a fluid flowing through a flow passage pipe arrangement 1 illustrated in FIG. 1 is represented as an integrated value of normal-directional components with respect to a flow passage cross-section of flow velocities at respective points on the flow passage cross-section, as follows:

$$Q = \int_S ds v_z \qquad (1)$$
$$= \int_{x_{min}}^{x_{max}} dx \int_{y_{min}(x)}^{y_{max}(x)} dy v_z(x, y)$$
$$= \int_{x_{min}}^{x_{max}} dx V_z(x) L(x)$$

where, $$V_z(x) = \frac{\int_{y_{min}(x)}^{y_{max}(x)} dy v_z(x, y)}{y_{max}(x) - y_{min}(x)} \qquad (2)$$

$$L(x) = y_{max}(x) - y_{min}(x). \qquad (3)$$

In the Formulas (1) to (3), S represents a flow passage cross-section, wherein a position in the flow passage cross-section S is represented by (x, y). $v_z$ represents a normal-directional (z-directional) component of a flow velocity of the fluid with respect to the flow passage cross-section S, and $v_z(x, y)$ represents a normal-directional component at a position (x, y) of a flow velocity of the fluid at the position (x, y) on the flow passage cross-section S. $y_{min}(x)$ and $y_{max}(x)$ represent, respectively, a minimum value and a maximum value of the y-coordinate when the x-coordinate is fixed on the flow passage cross-section S, and $x_{min}$ and $x_{max}$ represent, respectively, a minimum value and a maximum value of the x-coordinate on the flow passage cross-section S. Additionally, in FIG. 1, the flow passage cross-section $S_1$ is a plane orthogonal to an axis of the flow passage pipe arrangement 1, but even if the flow passage cross-section is inclined with respect to the axis, or is a curved surface, the flow rate can be represented by the above Formulas (1) to (3).

As is clear from the above Formula (2), when $x_i$ as the x-coordinate is set to a certain point, $V_z(x_i)$ represents an average of values of $v_z(x, y)$ for respective points (x, y), on a region in the flow passage cross-section S in which the x-coordinate is equal to $x_i$, namely on a line segment AB (FIG. 2), and the $V_z(x_i)$ can be measured by, for example, an ultrasonic wave method.

In one example, as illustrated in FIG. 3, assume that two points each shifted from a respective one of points A, B in a z-direction by a given distance are represented, respectively, as A* and B*. In this case, by utilizing a phenomenon that an apparent difference in sound velocity corresponding to flow velocity occurs between when an ultrasonic wave is propagated in a direction from the point A* to the point B* and when the ultrasonic wave is propagated in a direction from the point B* to the point A*, an average of values of $v_z(x, y)$ between A* and B* can be derived from respective propagation times in the two directions. Generally, the average value can be deemed as an average flow velocity $V_z(x_i)$ on the line segment AB.

More specifically, as illustrated in FIG. 4, an ultrasonic element 2a configured to transmit an ultrasonic wave from the point A* and an ultrasonic element 2b configured to transmit an ultrasonic wave from the point B* are disposed on the flow passage pipe arrangement 1, to measure a propagation time of the ultrasonic wave transmitted from the ultrasonic element 2a until it is received by the ultrasonic element 2b, and a propagation time of the ultrasonic wave transmitted from the ultrasonic element 2b until it is received by the ultrasonic element 2a. In a simple example, as described in the Patent Document 1, on an assumption that a propagation time of the ultrasonic wave transmitted from the ultrasonic element 2a to the ultrasonic element 2b until it reaches the ultrasonic element 2b via a path having a length L, and a propagation time of the ultrasonic wave transmitted from the ultrasonic element 2b to the ultrasonic element 2a until it reaches the ultrasonic element 2a via the path are represented, respectively, as $t_1$ and $t_2$, the average of the values of $v_z(x, y)$ can be determined by the following Formula (4) (where an angle between the ultrasonic wave transmission and receipt path and the z-direction is represented as θ (theta)).

$$\overline{v_z(x, y)} = \frac{L}{2 \cos \theta}\left(\frac{1}{t_2} - \frac{1}{t_1}\right) \qquad (4)$$

Generally, this average value can be used as a value of $V_z(x_i)$.

In practice, $V_z(x_i)$ can be measured at discrete positions. Thus, in many cases, it is necessary to calculate an approximate value of Q using numerical integration. Further, in the case of performing measurement using the pair of ultrasonic elements as illustrated in FIG. 4, it is conceivable to arrange the pairs of ultrasonic elements on the flow passage pipe arrangement in a number corresponding to the number of $x_i$ points to be measured. In this case, however, there is a limit on the number of measurement points which can be arranged, and thus it is necessary to use a calculation technique capable of maintaining good accuracy even under a small number of measurement points.

A method for deriving an approximate value of the flow rate Q represented by the Formula (1), from the discretely measured flow velocities, by Gaussian quadrature (Gauss-Legendre type, Chebyshev type, and Lobatto type) is disclosed in the Patent Document 2. The method disclosed in the Patent Document 2 is configured to determine an approximate value $Q_N$ of the flow rate Q by the following Formula, using Gaussian quadrature under a condition that an integrand is set to $V_z(x)L(x)$ and a weighting function is set to 1 (constant):

$$Q_N = \sum_{i=1}^{N} w_i V_z(x_i) L(x_i). \qquad (5)$$

In this Formula, $x_i$ and $w_i$ represent, respectively, a node and a coefficient of the Gaussian quadrature. The Formula (5) is calculated using discrete flow velocity values of $V_z(x_i)$ measured at respective nodes of $x=x_i$.

The Patent Documents 3 and 4 disclose a method for deriving an approximate value of flow rate of a fluid flowing through a flow passage of a circular pipe having a radius R, from a discretely measured flow velocities. In the flow passage of the circular pipe having a radius R, when the x-coordinate is defined on a flow passage cross-section, L(x) in the Formula (3) is expressed as follows:

$$L(x) = 2R\sqrt{1-\left(\frac{x}{R}\right)^2}. \quad (6)$$

Utilizing this, in the methods disclosed in the Patent Documents 3 and 4, on an assumption that the weighting function is set as follows:

$$\sqrt{1-\left(\frac{x}{R}\right)^2}, \quad (7)$$

and on an assumption that the integrand is set to $2RV_z(x)$, the nodes $x_i$ and the coefficients $w_i$ are calculated in accordance with Gaussian quadrature (Gauss-Chebyshev type). The approximate value $Q_N$ of the flow rate Q is determined by the following approximation formula, using discrete values of the flow velocity $V_z(x_i)$ measured at respective nodes of $x=x_i$;

$$Q_N = \sum_{i=1}^{N} w_i 2RV_z(x_i). \quad (8)$$

In the above conventional techniques, the flow velocity distribution itself is included in the integrand. Thus, there is a problem that, for example, in a situation where the flow velocity distribution is largely distorted, a higher-order quadrature (namely, a larger number of measurement points) is required to obtain an accurate approximate value.

LIST OF PRIOR ART DOCUMENTS

Patent Documents

Patent Document 1: JP 2001-208584A
Patent Document 2: U.S. Pat. No. 3,564,912A
Patent Document 3: U.S. Pat. No. 3,940,985A
Patent Document 4: JP S51-129261A

SUMMARY

Examples of Technical Problem

In view of the above circumstances, one or more implementations of the subject technology provide a method and apparatus for accurately measuring a flow rate even under a small number of measurement points.

Examples of Solution to the Technical Problem

One or more implementations of the subject technology provide a method for measuring a flow rate Q of a fluid flowing through a flow passage, the flow rate Q being represented by the following Formula:

$$Q = \int_S ds v_z \quad (9)$$
$$= \int_{x_{min}}^{x_{max}} dx \int_{y_{min}(x)}^{y_{max}(x)} dy v_z(x,y)$$
$$= \int_{x_{min}}^{x_{max}} dx V_z(x)L(x)$$

where, $$V_z(x) = \frac{\int_{y_{min}(x)}^{y_{max}(x)} dy v_z(x,y)}{y_{max}(x) - y_{min}(x)} \quad (10)$$

$$L(x) = y_{max}(x) - y_{min}(x) \quad (11)$$

(where: S represents a flow passage cross-section, wherein a position within the flow passage cross-section S is represented as (x, y); $v_z$ represents a normal-directional (z-directional) component with respect to the flow passage cross-section S of a flow velocity of the fluid, wherein $v_z(x, y)$ represents a normal-directional component at a position (x, y) of a flow velocity of the fluid at the position (x, y) on the flow passage cross-section S; and $y_{min}(x)$ and $y_{max}(x)$ represent, respectively, a minimum value and a maximum value of the y-coordinate when the x-coordinate is fixed on the flow passage cross-section S, wherein $x_{min}$ and $x_{max}$ represent, respectively, a minimum value and a maximum value of the x-coordinate on the flow passage cross-section S, wherein these apply to formulas described below), the method comprising the steps of:

determining a node $x_i$ and a coefficient $w_i$ for Gaussian quadrature (where i represents a natural number of 1 to N, where N represents an arbitrary natural number equal to or greater than 1), using a weighting function $V_{z0}(x) L(x)$ represented by, $$V_{z0}(x)L(x) \quad (12),$$

where $$V_{z0}(x) = \frac{\int_{y_{min}(x)}^{y_{max}(x)} dy v_{z0}(x,y)}{y_{max}(x) - y_{min}(x)}, \quad (13)$$

where $v_{z0}(x, y)$ represents an estimate value of a normal-directional component of a flow velocity at each position (x, y) within the flow passage cross-section S;

determining $V_z(x_i)$ and $V_{z0}(x_i)$ for respective nodes $x_i$; and determining an approximate value $Q_N$ of the flow rate Q, the approximate value $Q_N$ being represented by using the following Formula:

$$Q_N = \sum_{i=1}^{N} w_i \frac{V_z(x_i)}{V_{z0}(x_i)}. \quad (14)$$

As described above, the method of the subject technology is characterized by formulating a weighting function $V_{z0}(x)$ L(x) using an estimated flow velocity distribution on the flow passage cross-section S (which may be preliminarily derived by a theoretic calculation, a simulation, a preliminary experiment, or the like), and determining the approximate value of the flow rate by Gaussian quadrature. In this case, the integrand is expressed as:

$$\frac{V_z(x)}{V_{z0}(x)}. \quad (15)$$

This represents a ratio of an average of values of actual flow velocity distribution to an average of values of the estimated flow velocity distribution for a certain x-coordinate. When the estimated flow velocity distribution is more probable, the accuracy of approximation is increased because the integrand becomes closer to a constant function.

This method is also practicable using $V'_{z0}(x)$ obtained by modifying the $V_{z0}(x)$ with an appropriate offset function $V_{z1}(x)$.

That is, the subject technology provides a method for measuring a flow rate Q of a fluid flowing through a flow passage, the flow rate Q being represented by the Formulas (9) to (11), the method comprising the steps of:

determining a node $x_i$ and a coefficient $w_i$ for Gaussian quadrature (where i represents a natural number of 1 to N, where N represents an arbitrary natural number equal to or greater than 1), using a weighting function $V'_{z0}(x) L(x)$ represented by, $$V'_{z0}(x)L(x), \quad (18)$$
where $$V'_{z0}(x) = V_{z0}(x) + V_{z1}(x), \quad (16)$$
where $V_{z1}(x)$ is an offset function,
where $$V_{z0}(x) = \frac{\int_{y_{min}(x)}^{y_{max}(x)} dy v_{z0}(x, y)}{y_{max}(x) - y_{min}(x)}, \quad (17)$$

where $v_{z0}(x, y)$ represents an estimate value of a normal-directional component of a flow velocity at each position (x, y) within the flow passage cross-section S;

for respective nodes $x_i$, determining $V_z(x_i)$, and determining $V'_{z0}(x_i)$, $V_{z1}(x_i)$, and $Q_{z0}$ and $Q_{z1}$ each represented by a respective one of the following Formulas:

$$Q_{z0} = \int_{x_{min}}^{x_{max}} dx V_{z0}(x) L(x) \quad (19)$$

$$Q_{z1} = \int_{x_{min}}^{x_{max}} dx V_{z1}(x) L(x), \quad (20)$$

and determining an approximate value $Q_N$, the approximate value $Q_N$ being represented by the following Formula:

$$Q_N = \frac{\sum_{i=1}^{N} w_i \frac{V_z(x_i)}{V'_{z0}(x_i)}}{1 + \frac{Q_{z1}}{Q_{z0}} - \frac{1}{Q_{z0}} \sum_{i=1}^{N} w_i \frac{V_{z1}(x_i)}{V'_{z0}(x_i)}}. \quad (21)$$

This method is based on an idea of using the offset function $V_{z1}(x)$ to offset respective zero-points of $V_{z0}(x)$ and $V_z(x)$ to thereby introduce $V'_{z0}(x)$ and $V'_z(x)$, and then using them to apply Gaussian quadrature to a flow rate Q' obtained based on offset zero-points, as described below. As described below, it is possible to derive the Formula (21) by a process of: introducing a flow rate Q' obtained based on zero-points offset using $V'_z(x)$ instead of $V_z(x)$ in the Formula (9); applying Gaussian quadrature assigned with $V'_{z0}(x)L(x)$ as a weighting function to the flow rate Q' to thereby represent an approximate value $Q'_N$ in the form of polynomial approximation; and representing the $Q_N$ in the form of polynomial approximation using a relational formula between $Q'_N$ and $Q_N$.

In the above method that employs $V_{z1}(x)$, the $V_{z1}(x)$ is preferably selected to allow $V'_{z0}(x)$ to be always zero or more on the flow passage cross-section S, or to be always zero or less on the flow passage cross-section S.

In the case where the sign of the weighting function is not constant due to, for example, a so-called reverse flow, it may not be necessarily possible to have a node $x_i$ of Gaussian quadrature in the integral interval (a range taken by the x-coordinate on the flow passage cross-section S), so that it is possible that the measurement point $x_i$ of $V_z(x_i)$ or the calculation point $x_i$ of $V_0(x_i)$ cannot be implemented. Even in this case, by selecting the $V_{z1}(x)$ in such a manner as to allow the sign of the weighting function $V'_{z0}(x)L(x)$ to be constant in the integral interval (for example, setting an absolute value of the minimum value of $V_{z0}(x)$ to $V_{z1}(x)$, or by setting an absolute value of the maximum value of $V_{z0}(x) \times (-1)$ to $V_{z1}(x)$ allows the sign of the weighting function $V'_{z0}(x)L(x)$ to be constant), the node $x_i$ can be implemented in the integral interval as a corollary of the principle of Gaussian quadrature. Thus, it becomes possible to apparently avoid the reverse flow and accurately determine the flow rate.

However, as described below, it may also be possible to have the node $x_i$ in the integral interval even if the sign of the weighting function is changed in the integral interval. Therefore, it is not essential for the subject technology to select $V_{z1}(x)$ in such a manner as to allow the sign of the weighting function to be constant as described above.

The subject technology further provides a flow rate measurement method, comprising the steps of: determining the approximate value $Q_N$ according to the method provided by the subject technology as described above; and estimating an error range of the approximate value $Q_N$ based on the following Formula using a second approximate value $Q_{SUB}$ that is less reliable than the approximate value $Q_N$:

$$\text{if } Q_{SUB} < Q_N, \frac{Q_{SUB} - Q_N}{2} < Q - Q_N \quad (22)$$

$$\text{if } Q_{SUB} > Q_N, \frac{Q_{SUB} - Q_N}{2} > Q - Q_N.$$

As described below, this method makes it possible to estimate an error of the approximate value $Q_N$. As used herein, the term second approximate value $Q_{SUB}$ which is "less reliable than the approximate value $Q_N$" means an approximate value which is assumed to have an error greater than that of the approximate value $Q_N$ and which is determined by, for example, decreasing the number of measurement points N when using the method of the subject technology, or, as described below, by uniformly replacing values of the integrand of the Gaussian quadrature with a maximum or minimum value thereof, instead of individually calculating the integrand of the Gaussian quadrature for respective nodes $x_i$.

The subject technology further provides an apparatus for measuring a flow rate Q of a fluid flowing through a flow passage, the flow rate Q being represented by the Formulas (9) to (11), the apparatus comprising: a Gaussian quadrature operation section for determining a node $x_i$ and a coefficient $w_i$ for Gaussian quadrature (where i represents a natural number of 1 to N, where N represents an arbitrary natural number equal to or greater than 1), using a weighting function $V_{z0}(x)$ $L(x)$ represented by the Formulas (12) and (13), where $v_{z0}(x, y)$ represents an estimate value of a normal-directional component of a flow velocity at each position (x, y) within the flow passage cross-section S; a $V_z(x_i)$ determining section for determining $V_z(x_i)$ for each node $x_i$ determined by the Gaussian quadrature operation section; a $V_{z0}(x_i)$ determining section for determining $V_{z0}(x_i)$ for each node $x_i$ determined by the Gaussian quadrature operation section; and a $Q_N$ determining section for determining an approximate value $Q_N$ of the flow rate Q, the approximate value $Q_N$ being represented by using the Formula (14).

The subject technology further provides an apparatus for measuring a flow rate Q of a fluid flowing through a flow passage, the flow rate Q being represented by the Formulas (9) to (11), the apparatus comprising: a Gaussian quadrature operation section for determining a node $x_i$ and a coefficient $w_i$ for Gaussian quadrature (where i represents a natural number of 1 to N, where N represents an arbitrary natural number equal to or greater than 1), using a weighting function $V'_{z0}(x)L(x)$ represented by the Formula (18), using $V'_{z0}(x)$ represented by the Formulas (16), (17) using an offset function $V_{z1}(x)$, where $v_{z0}(x, y)$ represents an estimate value of a normal-directional component of a flow velocity at each position (x, y) on the flow passage cross-section S; a $V_z(x_i)$ determining section for determining $V_z(x_i)$ for each node $x_i$ determined by the Gaussian quadrature operation section; a $V'_{z0}(x_i)$, $V_{z1}(x_i)$, and $Q_{z0}$, $Q_{z1}$ determining section for determining $V'_{z0}(x_i)$, $V_{z1}(x_i)$ for each node $x_i$ determined by the Gaussian quadrature operation section, and $Q_{z0}$ and $Q_{z1}$ each represented by a respective one of the Formulas (19) and (20); and a $Q_N$ determining section for determining an approximate value $Q_N$, the approximate value $Q_N$ being represented by the Formula (21).

In the apparatus using the $V_{z1}(x)$, the Gaussian quadrature operation section is preferably configured to use the $V_{z1}(x)$ selected to allow $V'_{z0}(x)$ to be always zero or more in the flow passage cross-section S, or to be always zero or less in the flow passage cross-section S. However, as described above, it may also be possible to have the node $x_i$ in the integral interval even if the sign of the weighting function is changed in the integral interval. Therefore, it is not essential to select $V_{z1}(x)$ in such a manner as to allow the sign of the weighting function to be constant.

In the above apparatus provided by the subject technology, the $V_z(x_i)$ determining section may be configured to comprise:

a pair of ultrasonic elements, each placed at a position corresponding to each node $x_i$ on a flow passage pipe arrangement defining the flow passage;

an ultrasonic wave transmission and receipt circuit for giving an instruction of transmission and receipt of ultrasonic wave to the pair of ultrasonic elements;

an ultrasonic wave transmission and receipt signal recording circuit for recording an ultrasonic wave transmission and receipt-indicative signal indicative of transmission and receipt of the ultrasonic wave; and a flow velocity calculation circuit for calculating $V_z(x_i)$ for each node $x_i$ using the ultrasonic wave transmission and receipt-indicative signal recorded in the ultrasonic wave transmission and receipt signal recording circuit.

In addition, the above apparatus provided by the subject technology may further comprise an error range estimating section for estimating an error range of the approximate value $Q_N$ based on the Formula (22), using a second approximate value $Q_{SUB}$ that is less reliable than the approximate value $Q_N$.

Examples of Effect of Invention

According to one or more implementations of the subject technology, it is possible to formulate Gaussian quadrature optimal to a given flow velocity distribution. This makes it possible to accurately measure a flow rate under a small number of measurement points. The method and apparatus of one or more implementations of the subject technology are particularly effective for flow velocity distribution of unstraightened and distorted flow rate distribution.

In the Gaussian quadrature used in the subject technology, the integrand is not the flow velocity distribution itself, but represents a ratio of an actual flow velocity distribution with respect to an estimated flow velocity distribution. If a certain degree of probability of flow velocity distribution can be estimated in advance, the integrand becomes closer to a constant function even under a condition of significantly distorted flow velocity distribution and the like, so that it is possible to obtain a highly accurate approximate value of the flow rate.

Further, according to the error range estimation technique taught by the subject technology, it becomes possible to guess uncertainty of the actually measured flow rate (corresponding to an approximate error range of the integration) in a simplified manner. This makes it possible to evaluate the uncertainty of flow rate caused by an integration error without necessarily performing a comparison to a reference instrument. Of course, however, it is more secure to perform a comparison testing to the reference instrument if possible. This error range estimation technique is also applicable to a conventional art.

BRIEF DESCRIPTION OF THE DRAWINGS

FIG. 5 depicts only one pair as a representative.

FIG. 8 depicts only one pair as a representative.

DESCRIPTION OF EMBODIMENTS

Figure 1:
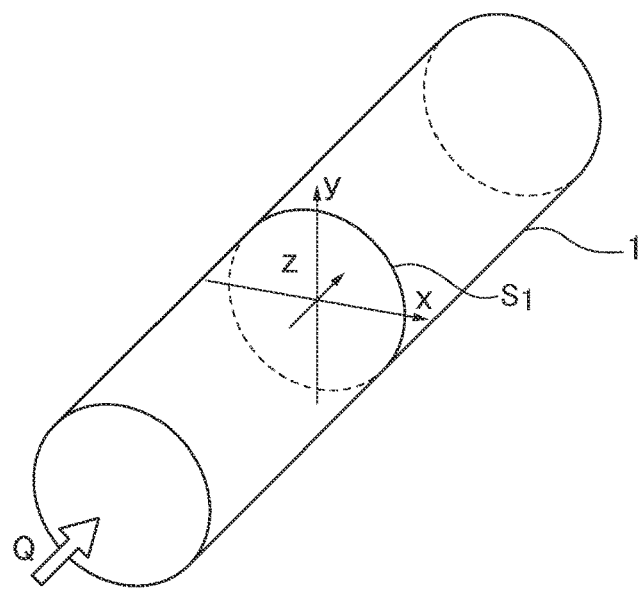
FIG. 1 is a diagram illustrating one example of a flow passage in which a flow rate measurement according to the subject technology may be performed.

With reference to the drawings, specific examples of a flow rate measurement method and a flow rate measurement apparatus of the subject technology will now be described. It is noted, however, that the flow rate measurement method and the flow rate measurement apparatus of the subject technology are not limited to the specific aspects described below, but are modifiable within a scope of the subject technology. For example, in the first embodiment, a flow rate of a fluid flowing through a flow passage of a circular pipe having a radius 1 is measured, but it is also possible to measure a flow rate of a fluid flowing through any other flow passage according to the subject technology. (Conventionally, the integral interval of Gaussian quadrature is deemed as [−1, 1]. Even when the x-interval of the flow passage cross-section is different therefrom, it is possible to have the integral interval of [−1, 1] by an appropriate variable transformation.) Further, in the respective embodiments below, as means for measuring an average value of normal-directional component of the flow velocity with respect to the flow passage cross-section, a system (a propagation time difference system) is used in which two ultrasonic elements are placed for every measurement point on the flow passage pipe arrangement, and a flow rate is determined from a difference in propagation times of the ultrasonic wave propagated in both directions between the ultrasonic elements. However, the embodiments are not so limited, and it is also possible to alternatively use any system such as a Pulse Doppler system suitable for opaque liquid. It is also possible to use, as a system other than those using the ultrasonic wave, any publicly known systems, and any system that will be feasible in the future. Further, in the embodiments below, the flow rate Q is measured as a volume flow rate, but alternatively, it is also possible to derive a mass flow rate by, for example, multiplying the measured volume flow rate by a density. Such a measurement of mass flow rate necessarily involves a measurement of volume flow rate, meaning that it falls within a technical scope of the subject technology. Furthermore, circuits illustrated in FIGS. 5 and 8 may be physically-isolated separate circuits, or conceptual and functional sections bearing each function in one circuit. Each circuit may comprise a plurality of circuits. For example, a $V'_{z0}(x_i)$, $V'_{z1}(x_i)$, $Q_{z0}$, $Q_{z1}$ calculation circuit in FIG. 8 may be a circuit group consisting of a circuit for calculating $V'_{z0}(x_i)$, a circuit for calculating $V'_{z1}(x_i)$, a circuit for calculating $Q_{z0}$, and a circuit for calculating $Q_{z1}$. Respective processing performed to implement the subject technology can be arbitrarily distributed to any one or more elements.

Gaussian Quadrature Herein

As used herein and in the Claim, the term "Gaussian quadrature" is a collective term referring to a general numerical integration method determining the finite number of nodes and coefficients by using a weighting function and performed as a polynomial approximation by using the nodes and coefficients. Specific values of the nodes and coefficients are dependent on a condition such as the weighting function. The Gaussian quadrature in such a general sense will be described below.

(1) A weighting function and an integral interval are set, respectively, to w(x) and X, and assigned as follows:

$$I_k = \int_X dx\, w(x) x^k \tag{23}$$

(2) With respect to the following orthogonal polynomial:

$$P_N(x) = \sum_{k=0}^{N} p_k x^k \tag{26}$$

having coefficients $p_k$ represented by the following formula:

$$\begin{bmatrix} p_0 \\ p_1 \\ \vdots \\ p_{N-1} \end{bmatrix} = - \begin{bmatrix} I_0 & I_1 & \cdots & I_{N-1} \\ I_1 & I_2 & \cdots & I_N \\ \vdots & \vdots & \ddots & \vdots \\ I_{N-1} & I_N & \cdots & I_{2N-2} \end{bmatrix}^{-1} \begin{bmatrix} I_N \\ I_{N+1} \\ \vdots \\ I_{2N-1} \end{bmatrix} \tag{24}$$

$$p_N = 1, \tag{25}$$

roots satisfying $P_N(x)=0$ are set as nodes $x_i$ (i=1, 2, ..., N) of Gaussian quadrature.

(3) Coefficients $w_i$ of Gaussian quadrature are derived by the following formula (27), in such a manner that a correct integrated value can be obtained in the case where the integrand is a polynomial of degree less than N:

$$\begin{bmatrix} w_1 \\ w_2 \\ \vdots \\ w_N \end{bmatrix} = \begin{bmatrix} (x_1)^0 & (x_2)^0 & \ldots & (x_N)^0 \\ (x_1)^1 & (x_2)^1 & \ldots & (x_N)^1 \\ \vdots & \vdots & \ddots & \vdots \\ (x_1)^{N-1} & (x_2)^{N-1} & \ldots & (x_N)^{N-1} \end{bmatrix}^{-1} \begin{bmatrix} I_0 \\ I_1 \\ \vdots \\ I_{N-1} \end{bmatrix}. \quad (27)$$

(4) With respect to a general integrand f(x), the integrated value is approximated with a finite sum as follows:

$$\int_X dx w(x) f(x) = \sum_{i=1}^{N} w_i f(x_i) + R_N. \quad (28)$$

The error term $R_N$ is represented by a form including a 2N-th derivative, so that, when the integrand f(x) is a polynomial of degree less than 2N, the approximation error becomes 0.

First Embodiment

Flow Rate Measurement Method According to the Subject Technology

According to a flow rate measurement method in one embodiment of the subject technology, the approximate value $Q_N$ shown in the above Formula (14) can be obtained through a following procedure in the above Gaussian quadrature: setting the weighting function w(x) to $V_{z0}(x)L(x)$ (Formula (12)); determining the nodes $x_i$ and the coefficients $w_i$ using the Formulas (23) to (27); setting the integrand f(x) to $V_z(x)/V_{z0}(x)$ (Formula (15)); and performing an arithmetic operation with the Formula (28).

Error Range Estimation According to the Subject Technology

Further, according to one embodiment of the subject technology, it is possible to estimate a range of error $Q-Q_N$ as described below.

An approximate value $Q_N$ of the flow rate Q that is deemed to be most probable is derived according to a flow rate measurement method in one embodiment of the subject technology. In addition, an approximate value $Q_{SUB}$ that is less reliable than $Q_N$, namely an approximate value $Q_{SUB}$ presumed to satisfy the following formula is derived by, for example, decreasing the number of measurement points utilized, and then using the flow rate measurement method of the subject technology or any other methods:

$$|Q-Q_N| < |Q-Q_{SUB}|. \quad (29)$$

Considering first a case of $Q_{SUB} < Q_N$, (1) When $Q_N \leq Q$ ($Q_N$ is equal or less than Q), the following formula is derived:

$$Q-Q_N \geq 0, Q_{SUB}-Q_N < 0 \quad (30)$$

From this formula, the following formula is obtained:

$$Q - Q_N > \frac{Q_{SUB} - Q_N}{2}. \quad (31)$$

(2) When $Q_N > Q$, firstly assuming $Q_{SUB} \geq Q$ ($Q_{SUB}$ is equal or greater than Q), $Q_{SUB} < Q_N$: $Q_{SUB}-Q < Q_N-Q$. This is inconsistent with the assumption that $Q_{SUB}$ is less reliable than $Q_N$. Thus, the following relation is employed: $Q_{SUB} < Q$. In this case, the following formula is derived from this assumption:

$$Q_N-Q < Q-Q_{SUB} \quad (32).$$

Then, the Formula (32) is arranged by adding $Q_N$ to each side thereof, to thereby obtain the Formula (31).

Considering next a case of $Q_{SUB} > Q_N$,
(1) When $Q_N \leq Q$ ($Q_N$ is equal or less than Q),
firstly, assuming $Q_{SUB} \leq Q$ ($Q_{SUB}$ is equal or less than Q), $Q_{SUB} > Q_N$: $Q-Q_{SUB} < Q-Q_N$. This is inconsistent with the assumption that $Q_{SUB}$ is less reliable than $Q_N$. Thus, the following relation is employed: $Q_{SUB} > Q$. In this case, the following formula is derived from this assumption:

$$Q-Q_N < Q_{SUB}-Q \quad (33).$$

Then, the Formula (33) is arranged by subtracting $Q_N$ from each side thereof, to thereby obtain the following Formula:

$$Q - Q_N < \frac{Q_{SUB} - Q_N}{2}. \quad (34)$$

(2) When $Q_N > Q$, the following formula is derived:

$$Q-Q_N < 0, Q_{SUB}-Q_N > 0 \quad (35).$$

From this formula, the Formula (34) is obtained.

To summarize, the error range of $Q_N$ can be estimated as:

$$\text{if } Q_{SUB} < Q_N, \frac{Q_{SUB} - Q_N}{2} < Q - Q_N \quad (36)$$

$$\text{if } Q_{SUB} > Q_N, \frac{Q_{SUB} - Q_N}{2} > Q - Q_N.$$

One example of the error range estimation using the Formula (36) will be provided below. As an approximate value that is less reliable than the approximate value $Q_N$ of the flow rate obtained by using $V_z(x)$ measured at N measurement points according to the flow rate measurement method of the first embodiment, it is possible to use $Q_{min}$ and $Q_{max}$ which are represented as:

$$Q_{min} = \sum_{i=1}^{N} w_i f_{min} \quad (37)$$

$$Q_{max} = \sum_{i=1}^{N} w_i f_{max},$$

where $f_{min}$ and $f_{max}$ are minimum and maximum values of N integrand values $V_z(x_i)/V_{z0}(x_i)$ respectively, each derived for the N measurement points $x_i$. $Q_{min} < Q_N < Q_{max}$, and it is believed that $Q_N$ is more accurate than $Q_{min}$ and $Q_{max}$ with practically sufficient probability. Therefore, if the Formula (36) is used, the error range of $Q_N$ can be approximated by the following Formula:

$$\frac{Q_{min} - Q_N}{2} < Q - Q_N < \frac{Q_{max} - Q_N}{2}. \quad (38)$$

Flow Rate Measurement Apparatus According to the Subject Technology

Figure 5:
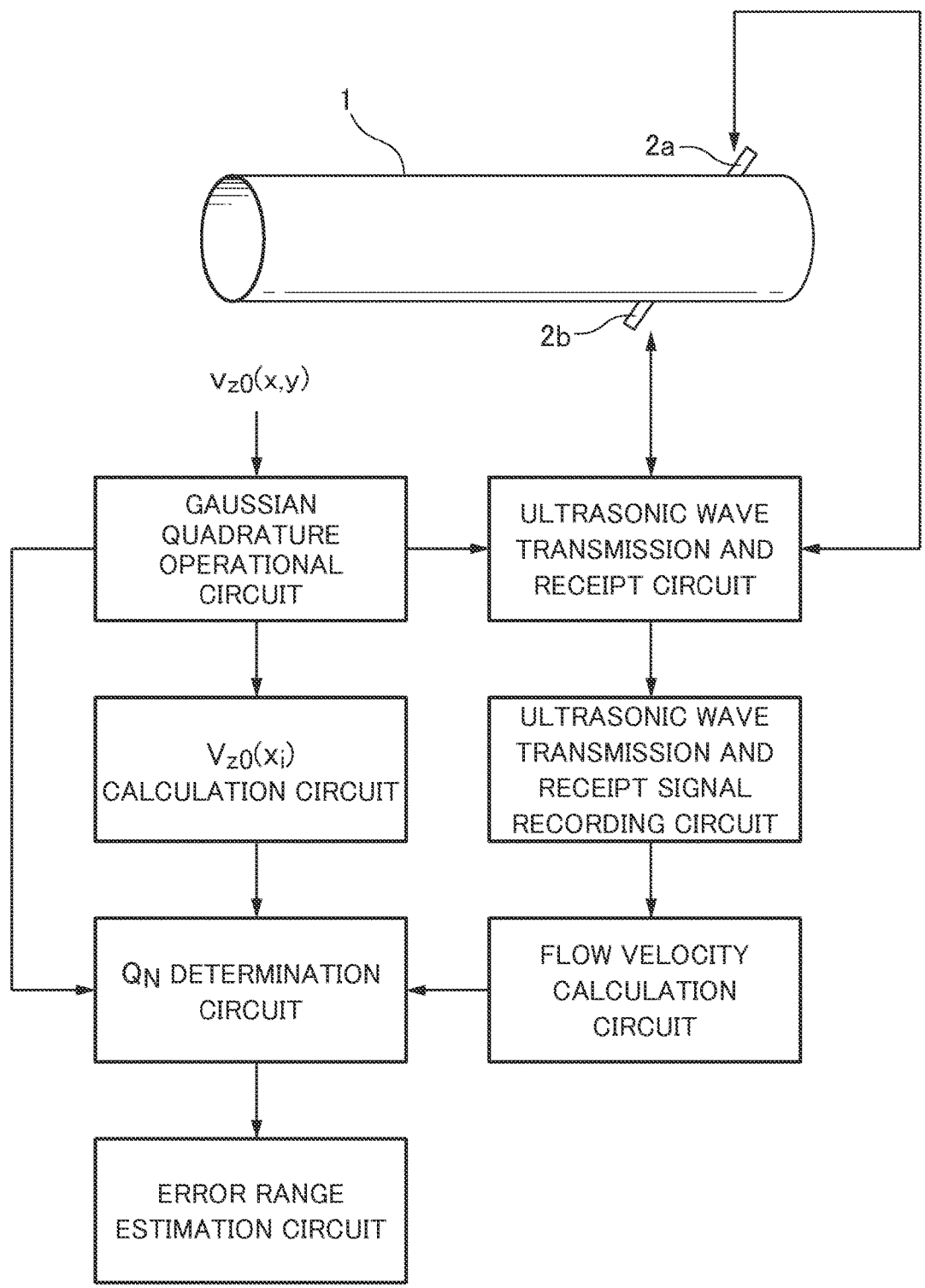
FIG. 5 is a structural diagram illustrating one embodiment of a flow rate measurement apparatus connected to a flow passage pipe arrangement 1, according to the subject technology. Note that although the pair of ultrasonic elements 2a, 2b is disposed on the flow passage pipe arrangement 1 in a number corresponding to the number of measurement points $x_i$.

An example of an apparatus capable of performing the flow rate measurement method of the subject technology is illustrated in FIG. 5. The flow rate measurement apparatus in FIG. 5 comprises: a Gaussian quadrature operational circuit; at least one pair of ultrasonic elements 2a, 2b placed on the flow passage pipe arrangement 1, an ultrasonic wave transmission and receipt circuit; an ultrasonic wave transmission and receipt signal recording circuit; a flow velocity calculation circuit; a $V_{z0}(x_i)$ calculation circuit; a $Q_N$ determination circuit; and, optionally, an error range estimation circuit. A $V_z(x_i)$ determining section is provided by the at least one pair of ultrasonic elements 2a, 2b, the ultrasonic wave transmission and receipt circuit, the ultrasonic wave transmission and receipt signal recording circuit and the flow velocity calculation circuit among these elements.

Into the Gaussian quadrature operational circuit, an estimate value $v_{z0}(x, y)$ of a normal-directional component of the flow velocity at each position (x, y) on the flow passage cross-section is input as an estimated flow velocity distribution. As illustrated in FIG. 1, in the case of using the flow passage cross-section $S_1$ orthogonal to the axis of the flow passage pipe arrangement 1, the normal direction (z-direction) corresponds to the axial direction, so that an estimate value $v_{z0}(x, y)$ of the axial flow velocity at each position (x, y) on the flow passage cross-section $S_1$ is input as the estimated flow velocity distribution. The Gaussian quadrature operational circuit formulates a weighting function $w(x)=V_{z0}(x)L(x)$ from the input $v_{z0}(x, y)$, and determines the node $x_i$ and the coefficient $w_i$ by the above described Gaussian quadrature.

Figure 2:
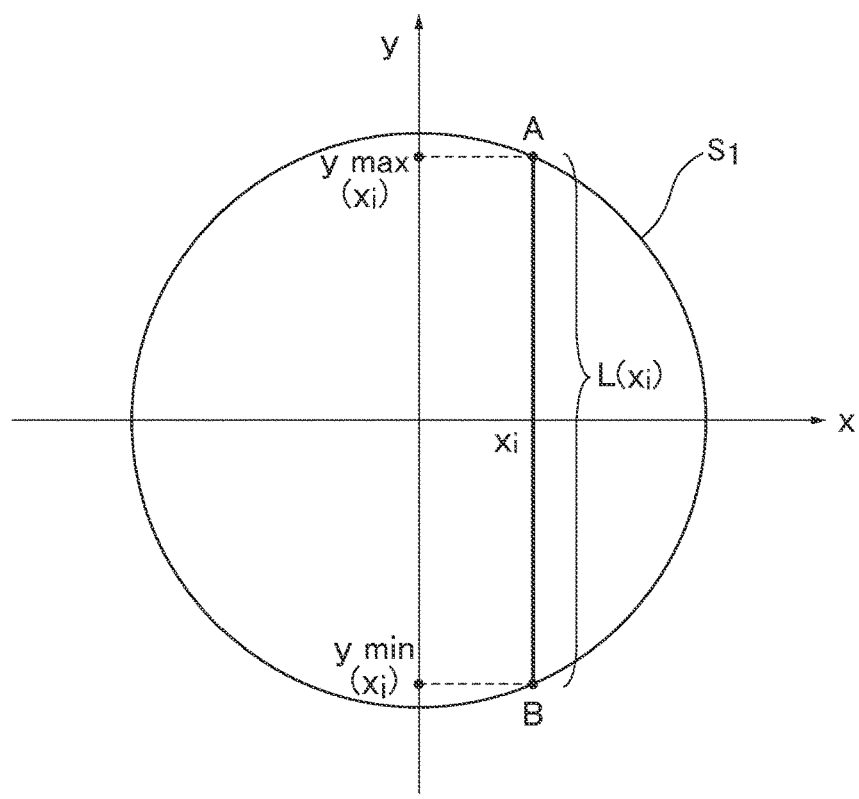
FIG. 2 is a diagram illustrating a flow passage cross-section $S_1$ of the flow passage illustrated in FIG. 1.
Figure 3:
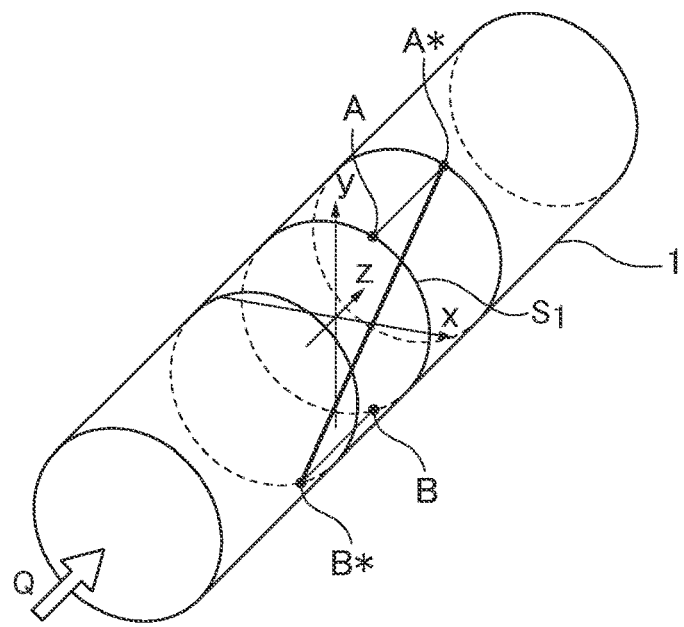
FIG. 3 is a diagram illustrating a route A*B* along which an ultrasonic wave is propagated in the flow passage illustrated in FIG. 1.
Figure 4:
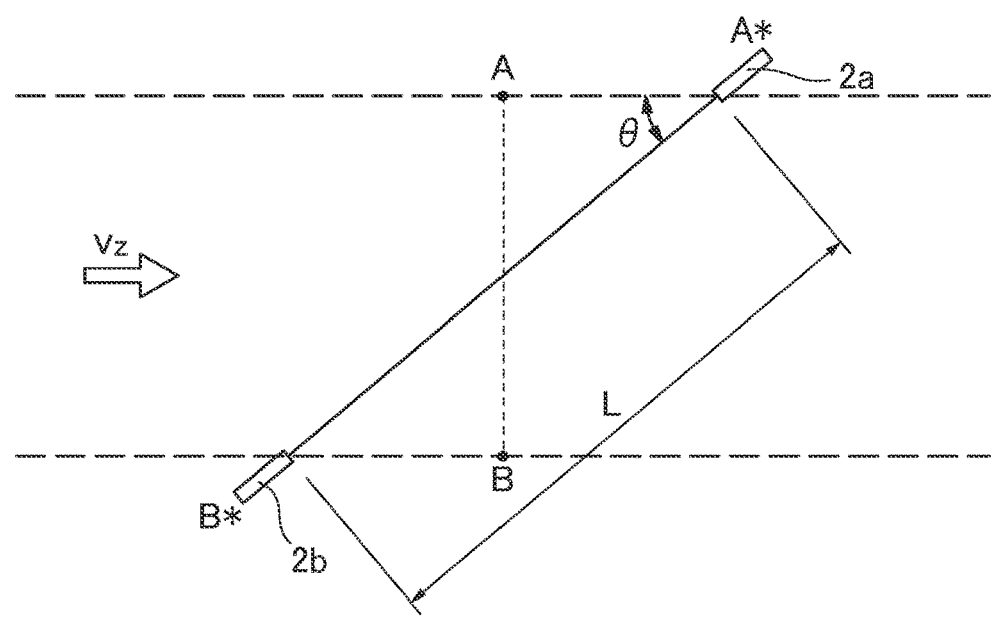
FIG. 4 is a diagram illustrating a route A*B* along which an ultrasonic wave is propagated in the flow passage illustrated in FIG. 1, as viewed from a direction orthogonal to an axis of the flow passage.

The ultrasonic elements 2a, 2b are a pair of ultrasonic elements placed at an angle in an opposed relation on the flow passage pipe arrangement 1, as already described with reference to FIG. 4. Specifically, with respect to each of the nodes $x_i$ (where i ranges from 1 to N) determined by the Gaussian quadrature operational circuit, points A, B on the flow passage cross-section each corresponding to a respective one of a maximum value and a minimum value of the y-coordinate are determined as illustrated in FIG. 2. Then, as illustrated in FIG. 3, assuming that two points each shifted from a respective one of points A, B in a z-direction by a given distance are represented, respectively, as A* and B*, the pair of ultrasonic elements 2a, 2b are installed at respective position capable of performing transmission and receipt of the ultrasonic wave between A* and B*. That is, N sets of pair of ultrasonic elements 2a, 2b are placed. Alternatively, it may also be possible to place multiple sets of pair of ultrasonic elements 2a, 2b on the flow passage pipe arrangement 1 in advance, and to allow only the pairs of ultrasonic elements 2a, 2b located at positions corresponding to the nodes $x_i$ determined by the Gaussian quadrature operational circuit to be operated by the ultrasonic wave transmission and receipt circuit.

The ultrasonic wave transmission and receipt circuit is a circuit operable to transmit an ultrasonic wave transmission and receipt-instructing signal instructing a transmission and receipt of the ultrasonic wave to the ultrasonic elements 2a, 2b, and receive the ultrasonic signal received by the ultrasonic elements 2a, 2b, as well as transmit an ultrasonic wave transmission and receipt-indicative signal indicative of the transmission and receipt of the ultrasonic wave to the ultrasonic wave transmission and receipt signal recording circuit.

The ultrasonic wave transmission and receipt signal recording circuit is a circuit operable to record the ultrasonic wave transmission and receipt-indicative signal transmitted from the ultrasonic wave transmission and receipt circuit. In one example, a signal indicative of $t_1$, $t_2$ in the Formula (4) is transmitted from the ultrasonic wave transmission and receipt circuit and is recorded in the ultrasonic wave transmission and receipt signal recording circuit.

The flow velocity calculation circuit is a circuit operable to receive the ultrasonic wave transmission and receipt-indicative signal from the ultrasonic wave transmission and receipt signal recording circuit, and perform an arithmetic operation on the signal to calculate $V_z(x_i)$ for each node $x_i$. In one example, the flow velocity calculation circuit receives a signal indicative of $t_1$, $t_2$ in the Formula (4) from the ultrasonic wave transmission and receipt signal recording circuit, calculatingly determines an average of values of $v_z(x, y)$ based on the Formula (4), and outputs the average value as $V_z(x_i)$. It is noted that L and $\theta$ (theta) in the Formula (4) shall be geometrically calculated by, for example, the Gaussian quadrature calculation circuit along with the node $x_i$ and the coefficient $w_i$, and input to the flow velocity calculation circuit.

The $V_{z0}(x_i)$ calculation circuit calculatingly determines $V_{z0}(x_i)$ using the estimated flow velocity distribution for each node $x_i$ determined by the Gaussian quadrature operation section. Since $y_{min}(x)$, $y_{max}(x)$ corresponding to each x-coordinate are determined by a shape of the flow passage cross-section, they can be preliminarily input to the $V_{z0}(x_i)$ calculation circuit. The node $x_i$ is input from the Gaussian quadrature operation section. The $v_{z0}(x, y)$ may be preliminarily input, or may be input from the Gaussian quadrature operation section.

The $Q_N$ determination circuit is a circuit operable to receive inputs, from each of the operation and calculation circuits, of the coefficient $w_i$ determined by the Gaussian quadrature operational circuit, $V_z(x_i)$ determined by the flow velocity calculation circuit, and $V_{z0}(x_i)$ determined by the $V_{z0}(x_i)$ calculation circuit, and to calculatingly determine the approximate value $Q_N$ of the flow rate according to the Formula (14) using the above inputs.

It is noted that, in most cases, there is no analytical solution in the arithmetic operation performed by each circuit, including Gaussian quadrature. Thus, a numerical arithmetic operation is typically performed by a calculator etc.

The error range estimation circuit is a circuit operable to receive an input of $Q_N$ from the $Q_N$ determination circuit and an input of the approximate value $Q_{SUB}$ that is less reliable than $Q_N$ from the $Q_N$ determination circuit or any other external circuit etc. (not illustrated) to estimate the error range according to the Formula (36).

Specific Example of the First Embodiment

Figure 6:
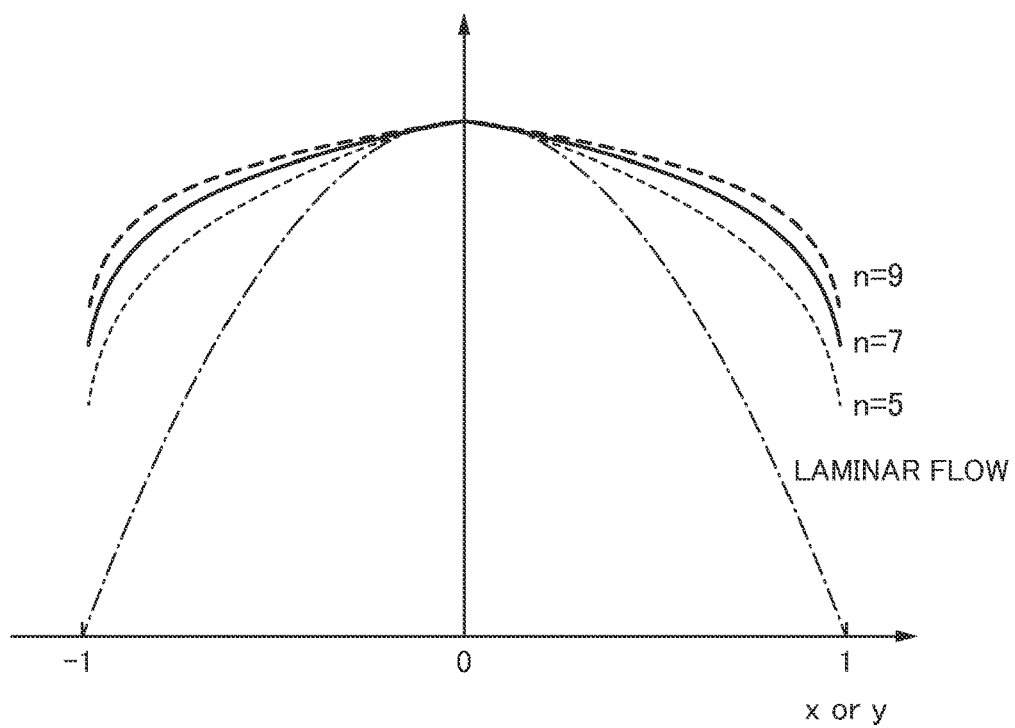
FIG. 6 is a graph illustrating an example of flow velocity distribution in a flow passage of a circular pipe.

Next, an operation of the flow rate measurement apparatus for obtaining an approximate value $Q_3$ of the flow rate according to the method of the subject technology on the assumption of N=3, in respective cases (FIG. 6) where an actual flow velocity distribution in a flow passage of a circular pipe having a radius 1 is represented by the following Formulas will be explained:

(Laminar Flow)

$$v_z(x,y)=1-(x^2+y^2) \tag{39}$$

(Exponential Law)

$$v_z(x,y)=(1-\sqrt{x^2+y^2})^{1/n} \tag{40},$$

where n=5, 7, 9.

In this first embodiment, the flow passage cross-section $S_1$ illustrated in FIG. 1 etc. is used as the flow passage cross-section, and it is assumed that the estimated value $v_{z0}(x, y)$ of the normal-directional component of the flow velocity is preliminarily given as:

$$v_{z0}(x,y)=(1-\sqrt{x^2+y^2})^{1/7} \tag{41}.$$

The estimated value $v_{z0}(x, y)$ is input to the Gaussian quadrature operational circuit. The Gaussian quadrature operational circuit formulates the following weighting function from the input value $v_{z0}(x, y)$, and determines the node $x_i$ and the coefficient $w_i$ according to the above described Gaussian quadrature.

$$w(x) = V_{z0}(x)L(x) \quad (42)$$

$$= \int_{-\sqrt{1-x^2}}^{\sqrt{1-x^2}} dy \left(1 - \sqrt{x^2+y^2}\right)^{\frac{1}{7}}.$$

In this specific example, $x_1$ through $x_3$ and $w_1$ through $w_3$ are determined because of N=3.

Figure 7:
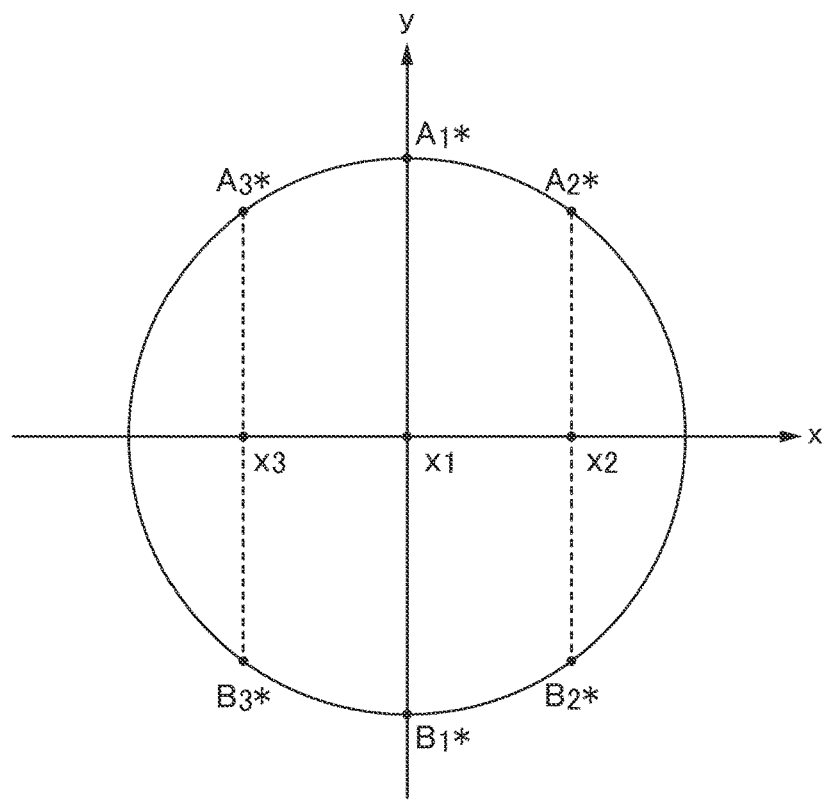
FIG. 7 is a diagram illustrating transmission and receipt points Ai*, Bi* of the ultrasonic wave when the flow rate measurement according to the subject technology is performed with the setting of N=3. Note, however, that positions of the measurement points $x_1$ to $x_3$ are not accurate. Further, the Ai*, Bi* are shifted from the flow passage cross-section $S_1$ in a z-direction by a given distance as in FIG. 3, but FIG. 7 does not illustrate a z-coordinate.

Corresponding to each of the nodes $x_1$ through $x_3$ determined above, the transmission and receipt points $A_1^*$ through $A_3^*$, $B_1^*$ through $B_3^*$ of the ultrasonic wave are determined (FIG. 7). Specifically, the points $A_1^*$ through $A_3^*$ and $B_1^*$ through $B_3^*$ are determined by determining points $A_1$ through $A_3$ and $B_1$ through $B_3$ for the nodes $x_1$ through $x_3$ in the manner as illustrated in FIG. 2 (the points A, B in FIG. 2 obtained by setting the point $x_i$ in FIG. 2 to a node $x_1$ are determined as the points $A_1$, $B_1$, the points A, B in FIG. 2 obtained by setting the point $x_i$ in FIG. 2 to a node $x_2$ are determined as the points $A_2$, $B_2$, and the points A, B in FIG. 2 obtained by setting the point $x_i$ in FIG. 2 to a node $x_3$ are determined as the points $A_3$, $B_3$), and shifting these points by a given distance in the z-direction (See FIG. 3. The points Ai and Bi are shifted to the opposite direction to each other.). Each of three pairs of ultrasonic elements 2a, 2b is placed at a position capable of performing transmission and receipt of the ultrasonic wave between each of $A_1^*$ and $B_1^*$, $A_2^*$ and $B_2^*$, and $A_3^*$ and $B_3^*$. The placement of the ultrasonic elements can be performed by an optional actuator etc. (not illustrated) connected to the Gaussian quadrature operational circuit. As already described above, if multiple sets of pair of ultrasonic elements 2a, 2b are placed on the flow passage pipe arrangement 1 in advance, and only the pairs of ultrasonic elements 2a, 2b located at a position corresponding to the node $x_i$ determined by the Gaussian quadrature operational circuit are operated by the ultrasonic wave transmission and receipt circuit, then the manipulation for placing the ultrasonic elements is not required.

Then, the ultrasonic wave transmission and receipt circuit transmits the ultrasonic wave transmission and receipt-instructing signal to the three pairs of ultrasonic elements 2a, 2b. The three pairs of ultrasonic elements 2a, 2b bi-directionally transmit and receive the ultrasonic wave each between $A_1^*$ and $B_1^*$, $A_2^*$ and $B_2^*$, and $A_3^*$ and $B_3^*$, and the ultrasonic signal received by each ultrasonic element is transmitted to the ultrasonic wave transmission and receipt circuit. The ultrasonic wave transmission and receipt circuit measures, from the received ultrasonic signal, the propagation times $t_1$, $t_2$ for each direction in each transmission and receipt passage, and transmits the propagation times to the ultrasonic wave transmission and receipt signal recording circuit as the ultrasonic wave transmission and receipt-indicative signal.

The ultrasonic wave transmission and receipt signal recording circuit records the propagation times $t_1$, $t_2$ for each direction in each transmission and receipt passage. The flow velocity calculation circuit receives the propagation times $t_1$, $t_2$ from the ultrasonic wave transmission and receipt signal recording circuit, and calculates $V_z(x_1)$ through $V_z(x_3)$ for the nodes $x_1$ through $x_3$ according to the Formula (4).

And, the $V_{z0}(x_i)$ calculation circuit calculatingly determines $V_{z0}(x_1)$ through $V_{z0}(x_3)$ for the nodes $x_1$ through $x_3$ using the estimated flow velocity distribution of the Formula (41) (In this case, $y_{max}(x) = \sqrt{}$ (square root of) $(1-x^2)$, and $y_{min}(x) = -\sqrt{}$ (square root of) $(1-x^2)$.). The $Q_N$ determination circuit calculatingly determines the approximate value $Q_3$ of the flow rate according to the Formula (14) using the coefficients $w_1$ through $w_3$ determined by the Gaussian quadrature operational circuit, $V_z(x_1)$ through $V_z(x_3)$ determined by the flow velocity calculation circuit, and $V_{z0}(x_1)$ through $V_{z0}(x_3)$ determined by the $V_{z0}(x_i)$ calculation circuit.

The error range estimation circuit receives an input of $Q_3$ from the $Q_N$ determination circuit and an input of the approximate value $Q_{SUB}$ that is less reliable than $Q_N$ from the $Q_N$ determination circuit or any external circuit etc., to estimate the error range according to the Formula (36). The approximate value $Q_{SUB}$ may be an approximate value of the flow rate determined for N other than 3 using the above each circuit, or may be an approximate value of the flow rate determined according to any method different from the subject technology.

Experiment Using the Flow Rate Measurement Method According to the Subject Technology For the operations other than the error range estimation among the above operations, a simulation according to a calculation simulation was performed. However, the measurement of the propagation times $t_1$, $t_2$ using the ultrasonic elements 2a, 2b was not performed, but $V_z(x_i)$ was directly calculated using $v_z(x, y)$ in the Formulas (39), (40). In addition, an approximate value of the flow rate was calculated in a similar way according to the conventional Gaussian quadrature. The calculation results thereof will be compared below.

The Table 1 shows the node $x_i$ and coefficient $w_i$ calculated for N=3, in various conventional Gaussian quadratures and the method of the subject technology. Note that, in the quadrature of the subject technology, the weighting function $V_{z0}(x)L(x)$ was formulated according to the Formulas (12) and (13) using $v_{z0}(x, y)$ in the Formula (41), and the node $x_i$ and coefficient $w_i$ are determined using the Formulas (23) to (27).

TABLE 1

| | N = 3 | |
|---|---|---|
| | $x_i$ | $w_i$ |
| (conventional example) Gauss-Legendre | $x_1$ = 0.00000 $x_{2,3}$ = +/−0.77460 | $w_1$ = 0.88889 $w_2$ = $w_3$ = 0.55556 |
| (conventional example) Chebyshev | 0.00000 +/−0.70711 | 0.66667 0.66667 |
| (conventional example) Lobatto | 0.00000 +/−0.65465 | 0.71111 0.54444 |
| (conventional example) Gauss-Chebyshev | 0.00000 +/−0.70711 | 0.78540 0.39270 |
| (subject technology) optimized to exponential law of n = 7 | 0.00000 +/−0.68906 | 1.32062 0.62251 |

In Table 1, in the case of N=3, $x_2$ and $x_3$ are in an opposite relation between plus and minus (For example, $x_1$=0.0000, and $x_2$, $x_3$=+/−0.77460 in the conventional example of Gauss-Legendre type), and $w_2$=$w_3$ ($w_1$=0.88889, and $w_2$=$w_3$=0.55556 in the conventional example of Gauss-Legendre type. The same applies to other conventional examples and the subject technology). It is noted that fixed nodes at either end in the Lobatto type quadrature are not included in Table 1 because the integrand can be deemed as zero.

Using the node $x_i$ and coefficient $w_i$ in Table 1, the methods of each conventional example and the subject technology are used to determine the approximate value $Q_3$ of the flow rate. Further, an actual flow rate Q was calculated from the Formulas (39) and (40) to calculate an actual error in the approximate value $Q_3$ determined in each of the methods. These results are shown in Table 2.

TABLE 2

| | integration error (%) 100 x \|$Q_N$ − Q \|/Q | | | |
|---|---|---|---|---|
| | laminar flow | exponential law n = 5 | exponential law n = 7 | exponential law n = 9 |
| (conventional example) Gauss-Legendre | 0.69 | 1.21 | 1.23 | 1.25 |
| (conventional example) Chebyshev | 3.40 | 1.61 | 1.91 | 2.05 |
| (conventional example) Lobatto | 0.29 | 0.75 | 1.14 | 1.37 |
| (conventional example) Gauss-Chebyshev | 0.0 | 0.76 | 0.58 | 0.47 |
| (subject technology) optimized to exponential law of n = 7 | 0.09 | 0.23 | 0.00 | 0.14 |

Comparing the theoretical values of integration errors for the conventional techniques and for the technique of the subject technology, the technique of the subject technology is more advantageous in most cases. In particular, where the flow velocity distribution is closer to $v_{z0}(x, y)$, the effect is larger.

Second Embodiment

As already described above, in the case where the sign of the weighting function is not constant due to a reverse flow etc., it is not always possible to have the node $x_i$ of the Gaussian quadrature in the integral interval. A method of virtually offsetting the zero-point of the flow velocity distribution in this case to apparently avoid the reverse flow will be described below.

This method is based on an idea of using an appropriate function $V_{z1}(x)$ to offset the zero-points of $V_{z0}(x)$, $V_z(x)$ as the following Formulas (43) and (44), and selecting $V_{z1}(x)$ particularly in such a manner as to allow $V'_{z0}(x)$ to be always zero or more in the flow passage cross-section S, or to be always zero or less in the flow passage cross-section S, thereby to keep the sign of the weighting function to be constant:

$$V'_{z0}(x) = V_{z0}(x) + V_{z1}(x) \tag{43}$$

$$V'_z(x) = V_z(x) + \frac{Q_N}{Q_{z0}} V_{z1}(x). \tag{44}$$

In this case, the following formula is applied.

$$Q_{z0} = \int_{x_{min}}^{x_{max}} dx V_{z0}(x) L(x) \tag{45}$$

$$Q_{z1} = \int_{x_{min}}^{x_{max}} dx V_{z1}(x) L(x).$$

Using the $V'_{z0}(x)$, $V'_z(x)$ obtained based on the offset zero-point, it is possible to formulate a flow rate Q' (46) obtained based on the offset zero-point, an integrand (47) for applying Gaussian quadrature to the flow rate Q', and a weighting function (48) as follows:

$$Q' = \int_{x_{min}}^{x_{max}} dx V'_z(x) L(x), \tag{46}$$

$$\frac{V'_z(x)}{V'_{z0}(x)}, \tag{47}$$

$$V'_{z0}(x) L(x). \tag{48}$$

If the weighting function of the Formula (48) is used to determine the node $x_1$ and coefficient $w_i$ of Gaussian quadrature, an approximate value $Q'_N$ of the flow rate Q' can be expressed as follows by using the $x_i$ and $w_i$.

$$Q'_N = \sum_{i=1}^{N} w_i \frac{V'_z(x_i)}{V'_{z0}(x_i)}. \tag{49}$$

Further, from the Formulas (44) to (46), the following formula is obtained:

$$Q = Q' - \frac{Q_{z1}}{Q_{z0}} Q_N. \tag{50}$$

Thus, by replacing Q and Q' with approximate values $Q_N$ and $Q'_N$ respectively, the following formula is obtained:

$$Q_N = Q'_N - \frac{Q_{z1}}{Q_{z0}} Q_N \tag{51}$$

Furthermore, from the Formulas (44), (49) and (51), the following formula is obtained:

$$Q_N = \frac{\sum_{i=1}^{N} w_i \frac{V_z(x_i)}{V'_{z0}(x_i)}}{1 + \frac{Q_{z1}}{Q_{z0}} - \frac{1}{Q_{z0}} \sum_{i=1}^{N} w_i \frac{V_{z1}(x_i)}{V'_{z0}(x_i)}}. \tag{52}$$

According to the Formula (52), it becomes possible to determine the approximate value $Q_N$ of the flow rate even in the presence of reverse flow and the like. Specifically, the approximate value $Q_N$ can be determined by: determining the node $x_i$ and coefficient $w_i$ of Gaussian quadrature using the weighting function $V'_{z0}(x) L(x)$ obtained based on an offset zero-point; determining $V_z(x_i)$ through the ultrasonic wave measurement or the like as described above for the determined measurement points $x_i$; calculatingly determining each of $V'_{z0}(x_i)$, $V_{z1}(x_i)$, $Q_{z0}$ and $Q_{z1}$ according to the definitional formulas; and substituting these values into the Formula (52).

In this case, as already described above, it may also be possible to have the node $x_i$ in the integral interval even if the sign of the weighting function is changed in the integral interval. For example, when the estimated flow velocity distribution is given by the following Formula (53), the sign of $V_{z0}(x)$ is changed in the interval of $[-1, 1]$ in the flow passage of a circular pipe having a radius 1 of $-1 \le x, y \le 1$ (x,y are equal or greater than $-1$, and equal or less than 1). However, application of Gaussian quadrature of the Formulas (23) to (27), where the weighting function is set to $V_{z0}(x)L(x)$ (N=3), results in nodes $x_1$, $x_2$, $x_3$=0.00, 0.75, $-0.75$, and coefficients $w_1$, $w_2$, $w_3$=0.05, $-0.36$, $-0.36$, so that it becomes possible to have the node $x_i$ in the integral interval:

$$v_{z0}(x, y) = \cos\frac{3}{2}\pi(x^2 + y^2). \tag{53}$$

In this case, $V_{z0}(x)$ corresponding to $x_1$ to $x_3$ is $V_{z0}(x_i)$ =0.19, $-0.81$, $-0.81$, so that the sign of the weighting function is surely changed. Also, in the case of introducing the offset function $V_{z1}(x)$, if the estimated flow velocity distribution is represented as the following Formula (54), and the offset function as $V_{z1}(x)$=1, for example, then $V'_{z0}(x)$ obtained by using the $V_{z1}(x)$ and $v_{z0}(x, y)$ in the Formula (54) is the same as $V_{z0}(x)$ obtained according to the Formula (13) using the Formula (53) (when the offset is not introduced). Thus, when Gaussian quadrature is performed with weighting function being $V'_{z0}(x)L(x)$, the node $x_i$ ($x_1$, $x_2$, $x_3$=0.00, 0.75, $-0.75$) is obtained in the integral interval:

$$v_{z0}(x, y) = \cos\frac{3}{2}\pi(x^2 + y^2) - 1. \tag{54}$$

Therefore, in both of the first and second embodiments, even if the sign of the weighting function is changed in the integral interval, it may be possible to obtain the approximate value of the flow rate according to Gaussian quadrature, theoretically.

For the approximate value $Q_N$ obtained using the Formula (52), it is also possible to estimate the error range according to the Formula (36) using the approximate value $Q_{SUB}$ that is less reliable than the $Q_N$.

Flow Rate Measurement Apparatus According to the Subject Technology

Figure 8:
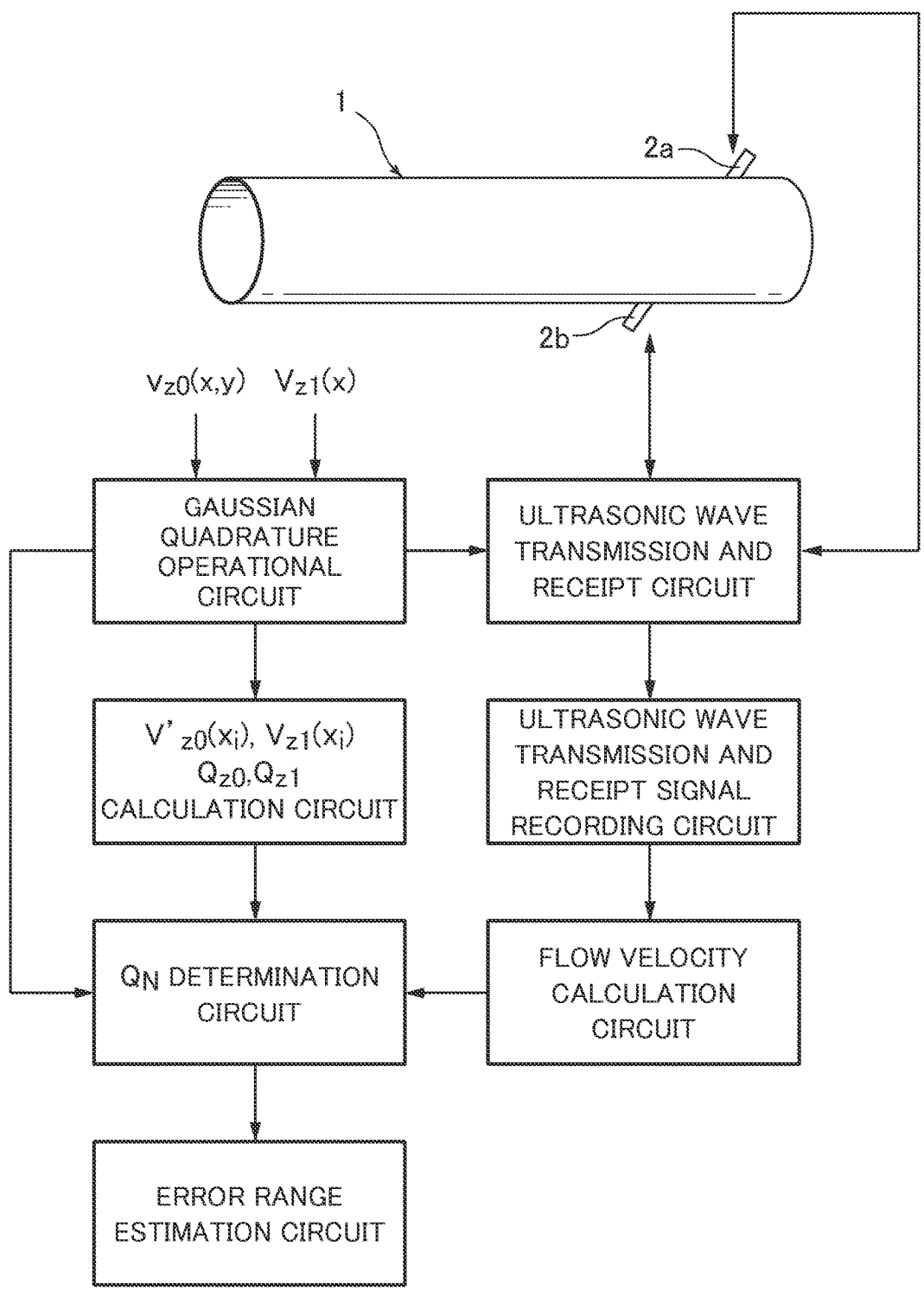
FIG. 8 is a structural diagram illustrating one embodiment of a flow rate measurement apparatus connected to a flow passage pipe arrangement 1, according to the subject technology. Note that although the pair of ultrasonic elements 2a, 2b is disposed on the flow passage pipe arrangement 1 in a number corresponding to the number of measurement points $x_i$.

One example of an apparatus capable of performing the flow rate measurement method of the subject technology described in the second embodiment is illustrated in FIG. 8. In the apparatus in FIG. 8, a $V'_{z0}(x)$, $V_{z1}(x_i)$, $Q_{z0}$, $Q_{z1}$ calculation circuit is used as substitute for the $V_{z0}(x)$ calculation circuit in the apparatus illustrated in FIG. 5. The structure and operation of the apparatus in FIG. 8 will be described below, in which an explanation of the same structure and operation as in the apparatus in FIG. 5 will be omitted.

The flow rate measurement apparatus in FIG. 8 comprises: a Gaussian quadrature operational circuit; at least one pair of ultrasonic elements 2a, 2b placed on the flow passage pipe arrangement 1, an ultrasonic wave transmission and receipt circuit; an ultrasonic wave transmission and receipt signal recording circuit; a flow velocity calculation circuit; a $V'_{z0}(x_i)$, $V_{z1}(x_i)$, $Q_{z0}$, $Q_{z1}$ calculation circuit; a $Q_N$ determination circuit, and, optionally, an error range estimation circuit. A $V_z(x_i)$ determining section is provided by the at least one pair of ultrasonic elements 2a, 2b, the ultrasonic wave transmission and receipt circuit, the ultrasonic wave transmission and receipt signal recording circuit and the flow velocity calculation circuit among these elements.

Into the Gaussian quadrature operational circuit, an estimate value $v_{z0}(x, y)$ of a normal-directional component of the flow velocity at each position (x, y) in the flow passage cross-section is input as an estimated flow velocity distribution, and preferably (although not necessary), an offset function $V_{z1}(x)$ is input which is selected in such a manner as to allow $V'_{z0}(x)$ represented by the Formula (16) to be always zero or more in the flow passage cross-section S, or to be always zero or less in the flow passage cross-section S. The Gaussian quadrature operational circuit formulates a weighting function $w(x)=V'_{z0}(x)L(x)$ from the input $v_{z0}(x, y)$, $V_{z1}(x)$, and determines the node $x_i$ and the coefficient $w_i$ according to the above described Gaussian quadrature.

The ultrasonic elements 2a, 2b may be the same elements as described in relation to the apparatus in FIG. 5. The measurement point $x_i$ at which the ultrasonic elements are to be disposed is determined using the modified weighting function $w(x)=V'_{z0}(x)L(x)$. Each of the ultrasonic wave transmission and receipt circuit, the ultrasonic wave transmission and receipt signal recording circuit and the flow velocity calculation circuit may also be the same circuit as described in relation to the apparatus in FIG. 5.

The $V'_{z0}(x_i)$, $V_{z1}(x_i)$, $Q_{z0}$, $Q_{z1}$ calculation circuit is a circuit operable to calculate $V'_{z0}(x_i)$ and $V_{z1}(x_i)$ for each node $x_i$ determined by the Gaussian quadrature operation section and calculatingly determine $Q_{z0}$ and $Q_{z1}$. The node $x_i$ is input from the Gaussian quadrature operation section. The $v_{z0}(x, y)$ may be preliminarily input, or may be input from the Gaussian quadrature operation section.

The $Q_N$ determination circuit is a circuit operable to receive inputs, from each of the operation and calculation circuits, of the coefficient $w_i$ determined by the Gaussian quadrature operational circuit, $V_z(x_i)$ determined by the flow velocity calculation circuit, and $V'_{z0}(x_i)$, $V_{z1}(x_i)$, $Q_{z0}$ and $Q_{z1}$ determined by the $V'_{z0}(x_i)$, $V_{z1}(x_i)$, $Q_{z0}$, $Q_{z1}$ calculation circuit, and calculatingly determine the approximate value $Q_N$ of the flow rate according to the Formula (21) using the inputs. As with the first embodiment, the arithmetic operation performed by each circuit is typically performed using a calculator etc.

The error range estimation circuit is a circuit operable to receive an input of $Q_N$ from the $Q_N$ determination circuit and an input of the approximate value $Q_{SUB}$ that is less reliable than $Q_N$ from the $Q_N$ determination circuit or any other external circuit etc. to estimate the error range according to the Formula (36).

Operation of the Flow Rate Measurement Apparatus in the Second Embodiment

Next, an operation of the flow rate measurement apparatus for obtaining an approximate value $Q_3$ of the flow rate according to the method of the subject technology on the assumption of N=3 will be explained, in the case where the flow velocity distribution is represented by $v_z(x, y)$. However, the explanation of the same operation as that described in the first embodiment will be omitted.

In the second embodiment, the flow passage cross-section $S_1$ illustrated in FIG. 1 etc. is used as a flow passage cross-section, and the estimate value of the normal-directional component of the flow velocity is assumed to be $v_{z0}(x, y)$. The estimate value $v_{z0}(x, y)$ is input to the Gaussian quadrature operational circuit. Further, as $V_{z1}(x)$, preferably (although not necessary), the $V_{z1}(x)$ selected to allow $V'_{z0}(x)=V_{z0}(x)+V_{z1}(x)$ to be always zero or more, or to be always zero or less in the flow passage cross-section $S_1$ is also input to the Gaussian quadrature operational circuit.

The Gaussian quadrature operational circuit formulates a weighting function $w(x)=V'_{z0}(x)L(x)$ from the input $v_{z0}(x, V_{z1}(x)$, and determines the node $x_i$ and the coefficient $w_i$ according to the above described Gaussian quadrature. In this specific example, $x_1$ through $x_3$ and $w_1$ through $w_3$ are determined because of N=3.

Corresponding to each of the nodes $x_1$ through $x_3$ determined above, the transmission and receipt points $A_1^*$ through $A_3^*$, $B_1^*$ through $B_3^*$ of the ultrasonic wave are determined (FIG. 7. However, an actual value of each of $x_1$ through $x_3$ is different from that in the first embodiment). Specifically, the points $A_1^*$ through $A_3^*$ and $B_1^*$ through $B_3^*$ are determined by determining points $A_1$ through $A_3$ and $B_1$ through $B_3$ for the nodes $x_1$ through $x_3$ in the manner as illustrated in FIG. 2 (the points A, B in FIG. 2 obtained by setting the point $x_i$ to a node $x_1$ in FIG. 2 are determined as the points $A_1$, $B_1$, the points A, B in FIG. 2 obtained by setting the point $x_i$ to a node $x_2$ in FIG. 2 are determined as the points $A_2$, $B_2$, and the points A, B in FIG. 2 obtained by setting the point $x_i$ to a node $x_3$ in FIG. 2 are determined as the points $A_3$, $B_3$), and shifting these points by a given distance in the z-direction (See FIG. 3. The points Ai and Bi are shifted to the opposite direction to each other.). Each of three pairs of ultrasonic elements 2a, 2b is placed at a position capable of performing transmission and receipt of the ultrasonic wave between each of $A_1^*$ and $B_1^*$, $A_2^*$ and $B_2^*$, and $A_3^*$ and $B_3^*$.

Then, the ultrasonic wave transmission and receipt circuit transmits the ultrasonic wave transmission and receipt-instructing signal to the three pairs of ultrasonic elements 2a, 2b. The three pairs of ultrasonic elements 2a, 2b bidirectionally transmit and receive the ultrasonic wave each between $A_1^*$ and $B_1^*$, $A_2^*$ and $B_2^*$, and $A_3^*$ and $B_3^*$, and the ultrasonic signal received by each ultrasonic element is transmitted to the ultrasonic wave transmission and receipt circuit. The ultrasonic wave transmission and receipt circuit measures, from the received ultrasonic signal, the propagation times $t_1$, $t_2$ for each direction in each transmission and receipt passage, and transmits the propagation times to the ultrasonic wave transmission and receipt signal recording circuit as the ultrasonic wave transmission and receipt-indicative signal.

The ultrasonic wave transmission and receipt signal recording circuit records the propagation times $t_1$, $t_2$ for each direction in each transmission and receipt passage. The flow velocity calculation circuit receives the propagation times $t_1$, $t_2$ from the ultrasonic wave transmission and receipt signal recording circuit, and calculates $V_z(x_1)$ through $V_z(x_3)$ for the nodes $x_1$ through $x_3$ according to the Formula (4).

In addition, the $V'_{z0}(x_i)$, $V_{z1}(x_i)$, $Q_{z0}$, $Q_{z1}$ calculation circuit calculates $V'_{z0}(x_i)$ and $V_{z1}(x_i)$ for each of the nodes $x_1$ through $x_3$ and calculatingly determines $Q_{z0}$ and $Q_{z1}$. The $Q_N$ determination circuit calculatingly determines the approximate value $Q_3$ of the flow rate according to the Formula (21) using the coefficients $w_1$ through $w_3$ determined by the Gaussian quadrature operational circuit, $V_z(x_1)$ through $V_z(x_3)$ determined by the flow velocity calculation circuit, and $V'_{z0}(x_1)$ through $V'_{z0}(x_3)$, $V_{z1}(x_1)$ through $V_{z1}(x_3)$, $Q_{z0}$ and $Q_{z1}$ determined by the $V'_{z0}(x_i)$, $V_{z1}(x_i)$, $Q_{z0}$, $Q_{z1}$ calculation circuit.

The error range estimation circuit receives an input of value of $Q_3$ from the $Q_N$ determination circuit and an input of the approximate value $Q_{SUB}$ that is less reliable than $Q_N$ from the $Q_N$ determination circuit or any external circuit etc., to estimate the error range according to the Formula (36). The approximate value $Q_{SUB}$ may be an approximate value of the flow rate determined for N other than 3 using the above each circuit, or may be an approximate value of the flow rate determined according to any method different from the subject technology.

Experiment Using the Flow Rate Measurement Method According to the Subject Technology In a practical fluid facility, the flow velocity distribution may be disturbed by various structural instruments and objects in the flow passage, resulting in errors occurring in the flow rate measurement. For the flow rate measurement accuracy in such a flow passage having unstraightened flow, effectiveness of the subject technology will be exemplified by comparing the result of measurement using the flow rate measurement method of the subject technology with the result of measurement according to the conventional art.

(Implementation Method)

Figure 9A:
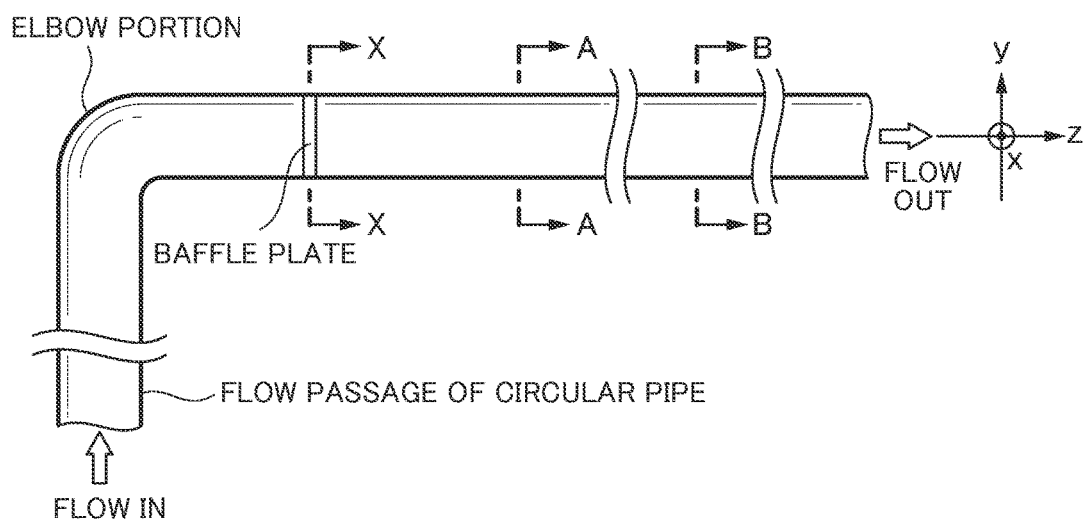
FIG. 9A is a diagram illustrating a flow passage of a circular pipe having a baffle plate provided therein, as an example of the flow passage pipe arrangement 1 in FIG. 8
Figure 9B:
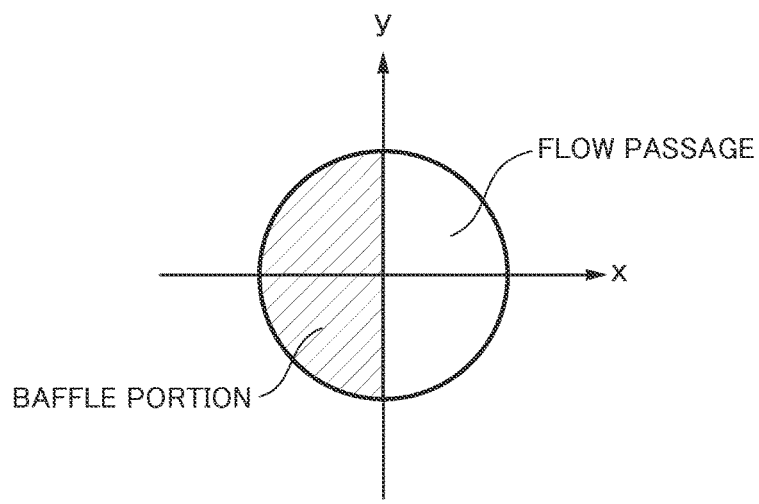
FIG. 9B is a plane view of the baffle plate as viewed in an xy-plane.

As a typical example of a passage of unstraightened flow, consideration will be made on a flow passage of a circular pipe having a bent tube (elbow portion) and a baffle plate (partially sealing the flow passage cross-section downstream the bent tube) disposed therein (FIG. 9A, 9B). The baffle plate is disposed at a position X in FIG. 9A, and a cross-section thereof is semicircular as illustrated in FIG. 9B. In this regard, the flow passage cross-section has a circular shape having a diameter of 83 mm.

Into the flow passage of a circular pipe in FIG. 9A, a test fluid (water) continues to flow with a constant flow rate of 5 (liter/sec.). According to the second embodiment, a flow rate is measured at a cross-section A (immediately downstream the bent tube and baffle plate: a position about 200 mm away from the position X in an axial direction). Note that the estimated flow velocity distribution is derived by a preliminary simulation. A reverse flow occurs downstream the baffle plate, so that it is required to formulate Gaussian quadrature with virtually offsetting the zero-point of the flow velocity distribution. In this case, by taking $V_{z1}(x)$ as a constant function (single the flow passage cross-section average of the estimated flow velocity), the weighting function was formulated based on the Formulas (16) to (18), and the flow rate was measured according to the method of the second embodiment.

Further, as a comparative target, a flow rate was measured at the cross-section A according to the conventional art in the Patent Documents 3 and 4 (Gauss-Chebyshev type quadrature). Furthermore, as a reference value of the flow rate, a flow rate was also measured at the cross-section B (sufficiently downstream the bent tube and baffle plate: a position of 3000 mm or more away from the position X in an axial direction) using a general-purpose flow rate measurement apparatus. Each value of the node $x_i$ and a coefficient $w_i$ of Gaussian quadrature, $V_{z0}(x_i)$, $Q_{z0}$, $V_{z1}(x_i)$ and $Q_{z1}$ when the flow rate is measured according to the method of the second embodiment of the subject technology is shown in Table 3. Note that the radius of the flow passage is assumed to be 1, and the estimated flow velocity is normalized to be 1 in an average of flow passage cross-section. When the flow rate was measured according to the Gauss-Chebyshev type quadrature (N=3), the node $x_1$ was: $x_1$, $x_2$, $x_3$=0.00, 0.71, −0.71, and the coefficient $w_i$ was: $w_1$, $w_2$, $w_3$=0.79, 0.39, 0.39.

TABLE 3

|  |  | N = 3 | | | |
| --- | --- | --- | --- | --- | --- |
|  |  | $x_i$ | $w_i$ | $V_{z0}(x_i)$ | $Q_{z0}$ |
| (subject technology) second embodiment | i = 1 | 0.12 | 3.20 | 1.19 | 3.14 |
|  | i = 2 | 0.73 | 2.17 | 2.33 |  |
|  | i = 3 | −0.63 | 0.93 | −0.10 |  |

|  |  | N = 3 | | |
| --- | --- | --- | --- | --- |
|  |  | $V_{z1}(x_i)$ | $Q_{z1}$ | error (%) |
| (subject technology) second embodiment | i = 1 | 1.00 | 3.14 | 0.20 |
|  | i = 2 | 1.00 |  |  |
|  | i = 3 | 1.00 |  |  |

The errors in the flow rates each measured at the cross-section A according to the method of the second embodiment and the conventional art were evaluated by comparing with the reference flow rate value measured at the cross-section B.

Figure 10:
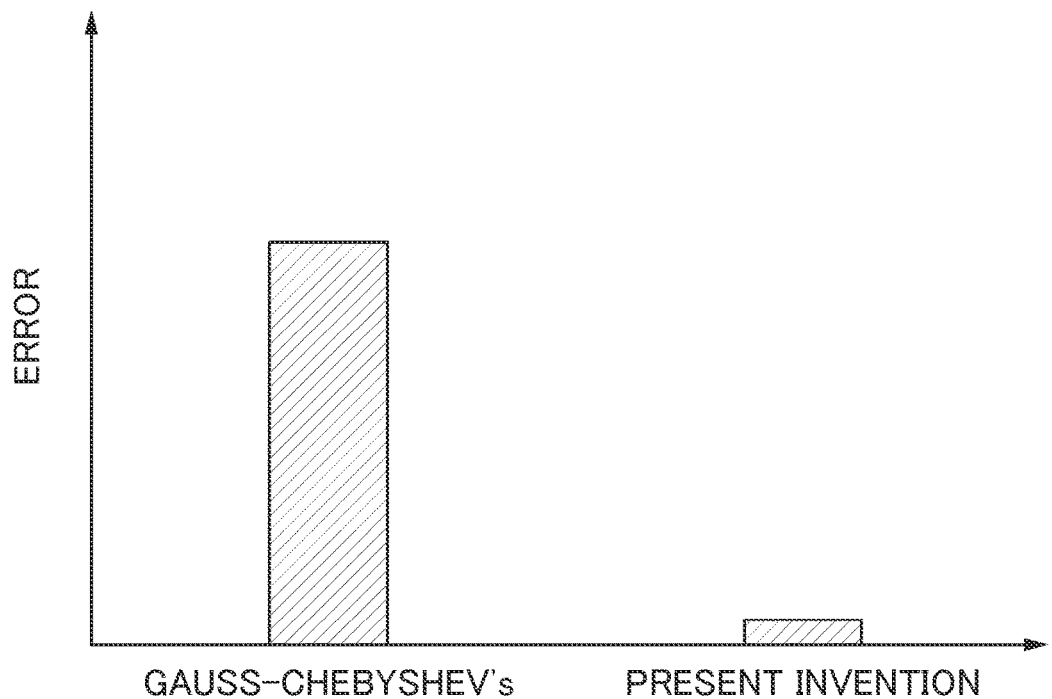
FIG. 10 is a graph illustrating an error in a flow rate as measured in a cross-section at point A in FIG. 9 according to a conventional Gaussian quadrature (Gauss-Chebyshev type) and an error in a flow rate as measured similarly in a cross-section at point A according to a method of the subject technology.

FIG. 10 illustrates an absolute value of a difference between "a flow rate measured at a cross-section B" and "a flow rate measured at a cross-section A" in each case of using a conventional Gauss-Chebyshev quadrature and of using the method of the second embodiment, as a flow rate measurement method at the cross-section A. The figure shows that the subject technology is capable of reducing the flow rate measurement error to about the one-tenth thereof, as compared to the conventional art.

Figure 11:
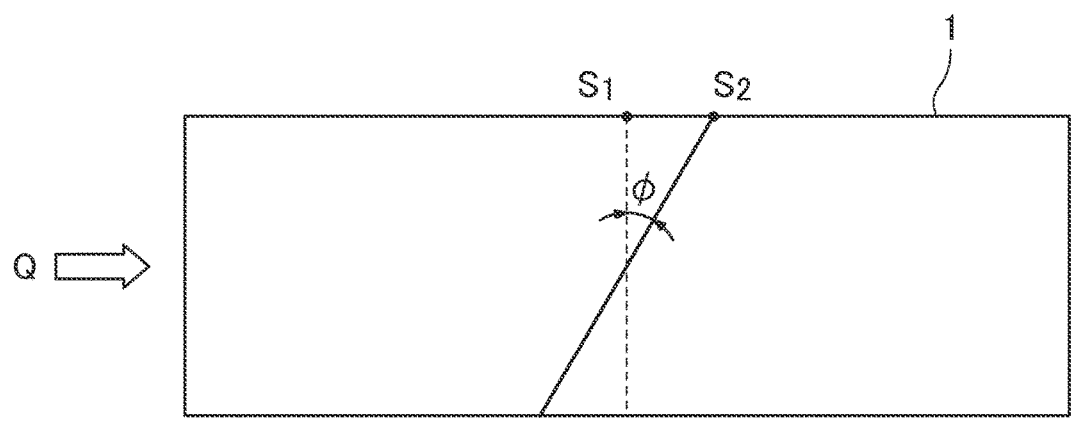
FIG. 11 is a diagram illustrating a surface S2 inclined at an angle of φ (phi) with respect to the axis of the flow passage, as another example of the flow passage cross-section.
Figure 12:
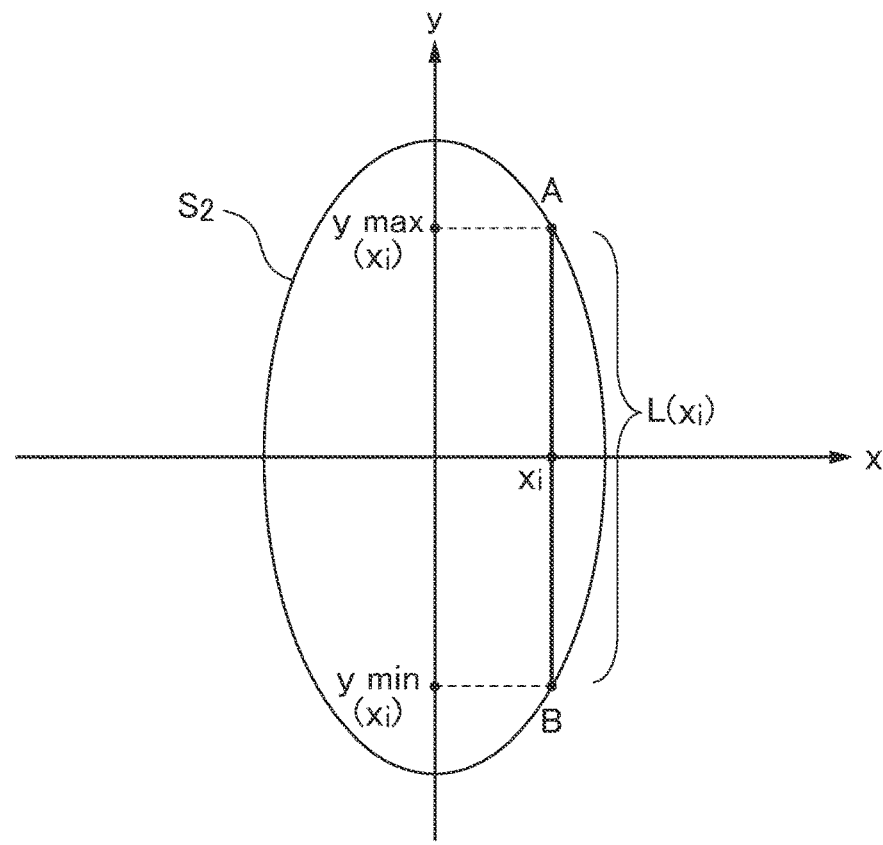
FIG. 12 is a diagram illustrating the flow passage cross-section $S_2$ as viewed from a normal direction thereof.
Figure 13:
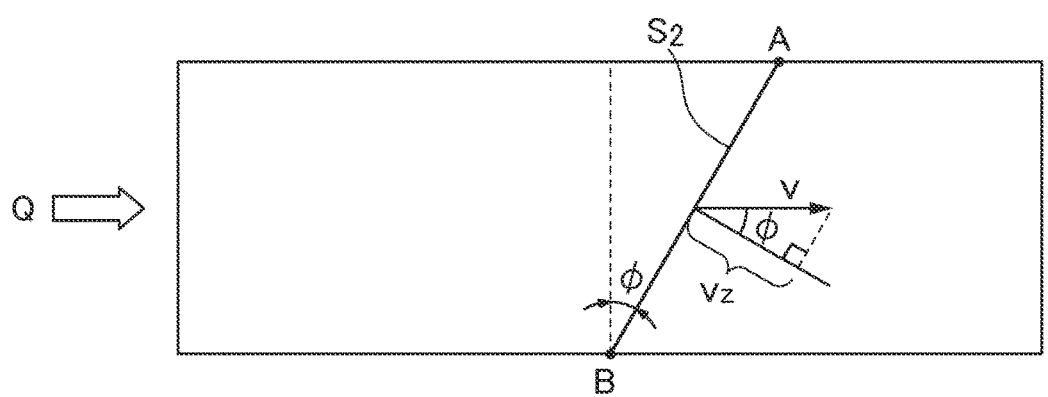
FIG. 13 is a diagram illustrating a method for determining a normal-directional component $v_z$ of a flow velocity v when the flow passage cross-section $S_2$ is used.

As already described above, even when the flow passage cross-section is an inclined or curved surface, the subject technology makes it possible to measure the flow rate in the same principle. For example, when a flow passage cross-section $S_2$ inclined at an angle $\phi$ (phi) with respect to an axis of the flow passage (which is obtained by rotating the flow passage cross-section $S_1$ by $\phi$ (phi) about the x-axis in FIG. 1) is used as illustrated in FIG. 11, the flow rate can be measured by defining the x- and y-coordinates on the flow passage cross-section $S_2$ as illustrated in FIG. 12, and in the similar method as that already described above. In this case, if the fluid is flowing in the axial direction of the flow passage pipe arrangement 1 as illustrated in FIG. 11, the normal-directional (z-directional) component of the flow velocity with respect to the flow passage cross-section $S_2$ is represented by $v_z(x, y) = v(x, y) \cdot \cos \phi$ (phi), where $v(x, y)$ is a measure of the flow velocity (FIG. 13). Further, each of the positions A*, B* for performing transmission and receipt of the ultrasonic wave may be the position shifted from each of A, B illustrated in FIG. 12 by a given distance in axially opposite directions of the flow passage pipe arrangement 1. In this case, in the above-described propagation time difference system, the average flow velocity obtained by using the Formula (4) multiplied by $\cos \phi$ (phi) provides $V_z(x_i)$. Even in the case where the flow passage cross-section is a curved surface, $v_z(x, y)$ can be determined to perform the flow rate measurement in a similar manner by using a normal-directional component corresponding to each position (x, y) on the flow passage cross-section (using different $\phi$ (phi) at each position (x, y)). Alternatively, it is also possible to determine a plane which is best approximated to this curved surface by means of, for example, a least-square approach, and, for example, use the determined plane as a virtual flow passage cross-section, thereby to measure the average flow velocity using the Formula (4) (set a representative value of the inclined angle to $\phi$ (phi), and multiply by $\cos \phi$ (phi)) and determine the flow rate.

EXAMPLES OF INDUSTRIAL APPLICABILITY

The measurement method and measurement apparatus of the subject technology can be potentially used for high-accuracy general flow rate measurement. For example, when used in an actual plant etc., it becomes possible to perform an accurate measurement under the flow velocity distribution of unstraightened flow in contrast to the conventional way. Thus, it can be expected, for example, to shorten the pipe line elongated for flow-straightening, improve the degree of freedom in a position for attaching a flowmeter, and so on.

EXPLANATION OF CODES

1: flow passage pipe arrangement
2a, 2b: ultrasonic element

What is claimed is:
1. A method for measuring a flow rate Q of a fluid flowing through a flow passage, wherein the flow rate Q is represented by the following:

$$Q = \int_S ds v_z$$
$$= \int_{x_{min}}^{x_{max}} dx \int_{y_{min}(x)}^{y_{max}(x)} dy v_z(x, y)$$
$$= \int_{x_{min}}^{x_{max}} dx V_z(x) L(x)$$

where, $$V_z(x) = \frac{\int_{y_{min}(x)}^{y_{max}(x)} dy v_z(x, y)}{y_{max}(x) - y_{min}(x)}$$
$$L(x) = y_{max}(x) - y_{min}(x)$$

(where: S represents a flow passage cross-section, wherein a position within the flow passage cross-section S is represented as (x, y), where an x-direction and a y-direction lie in the flow passage cross-section S and are perpendicular to each other and to a normal direction (z-direction);
$v_z$ represents a normal-directional (z-directional) component with respect to the flow passage cross-section S of a flow velocity of the fluid, wherein $v_z(x, y)$ represents a normal-directional component at a position (x, y) of a flow velocity of the fluid at the position (x, y) on the flow passage cross-section S, $V_z(x)$ represents an actual averaged flow velocity along the y-direction at an x-coordinate value, and L(x) represents a length of S in the y-direction at an x-coordinate value; and
$y_{min}(x)$ and $y_{max}(x)$ represent, respectively, a minimum value and a maximum value of the y-coordinate when the x-coordinate is fixed on the flow passage cross-section S, wherein $x_{min}$ and $x_{max}$ represent, respectively, a minimum value and a maximum value of the x-coordinate on the flow passage cross-section S),
the method comprising:
performing a preliminary experiment, a simulation of the fluid flowing through the passage, or a theoretical calculation based on preliminary data, and estimating a value of a normal-directional component of a flow velocity at each position (x, y) within the flow passage cross-section S;

setting an input value $v_{z0}(x, y)$ based on the estimated value of a normal-directional component of a flow velocity at each position (x, y) within the flow passage cross-section S;

using the set input value $v_{z0}(x, y)$, determining where to place a pair of ultrasonic elements on a flow passage pipe arrangement and parameters for an approximate flow rate of the flow passage defined by the flow passage pipe arrangement, using a weighting function $V_{z0}(x) L(x)$ represented by, $$V_{z0}(x) = \frac{\int_{y_{min}(x)}^{y_{max}(x)} dy v_{z0}(x, y)}{y_{max}(x) - y_{min}(x)}$$

where $V_{z0}(x)$ represents an estimated averaged flow velocity along the y-direction at an x-coordinate value, wherein each of locations where to place the pair of ultrasonic elements is represented by a corresponding node $x_i$, and each of the parameters is represented by a coefficient $w_i$ for Gaussian quadrature (where i represents a natural number of 1 to N, where N represents an arbitrary natural number equal to or greater than 1), and wherein the locations determined using the weighting function allow the flow rate to be determined more accurately than locations determined using another weighting function that equals to 1;

placing the pair of ultrasonic elements on the locations determined using the weighting function, the locations being on the flow passage pipe arrangement defining the flow passage;

instructing transmission and receipt of an ultrasonic wave by the pair of ultrasonic elements using an ultrasonic wave transmission and receipt circuit;

recording an ultrasonic wave transmission and receipt-indicative signal indicative of transmission and receipt of the ultrasonic wave using an ultrasonic wave transmission and receipt signal recording circuit;

determining actual averaged flow velocities at the locations of the pair of ultrasonic elements, using a flow velocity calculation circuit, based on the recorded ultrasonic wave transmission and receipt-indicative signal, wherein the determining of the actual averaged flow velocities uses the pair of ultrasonic elements placed at the locations determined using the weighting function, wherein each of the actual averaged flow velocities is along the y-direction and is represented by $V_z(x_i)$ for a corresponding node $x_i$;

determining estimated averaged flow velocities at the locations of the pair of ultrasonic elements determined using the weighting function, wherein each of the estimated averaged flow velocities is along the y-direction and is represented by $V_{z0}(x_i)$ for a corresponding node $x_i$; and determining the approximate flow rate of the flow passage defined by the flow passage pipe arrangement, based on the parameters determined using the weighting function and based on the actual averaged flow velocities and the estimated averaged flow velocities, wherein the actual averaged flow velocities are determined using the pair of ultrasonic elements placed at the locations determined using the weighting function, wherein the approximate flow rate is determined as the flow rate Q, wherein the approximate flow rate is represented by an approximate value $Q_N$ which is represented by the following:

$$Q_N = \sum_{i=1}^{N} w_i \frac{V_z(x_i)}{V_{z0}(x_i)}.$$

2. The method as defined in claim 1, further comprising:
estimating an error range of the approximate value $Q_N$ based on the following Formula using a second approximate value $Q_{SUB}$ that is less reliable than the approximate value $Q_N$:

if $Q_{SUB} < Q_N$, $\frac{Q_{SUB} - Q_N}{2} < Q - Q_N$ if $Q_{SUB} > Q_N$, $\frac{Q_{SUB} - Q_N}{2} > Q - Q_N$.

3. A method for measuring a flow rate Q of a fluid flowing through a flow passage, wherein the flow rate Q is represented by the following:

$$Q = \int_S ds v_z$$
$$= \int_{x_{min}}^{x_{max}} dx \int_{y_{min}(x)}^{y_{max}(x)} dy v_z(x, y)$$
$$= \int_{x_{min}}^{x_{max}} dx V_z(x) L(x)$$

where, $$V_z(x) = \frac{\int_{y_{min}(x)}^{y_{max}(x)} dy v_z(x, y)}{y_{max}(x) - y_{min}(x)}$$

$$L(x) = y_{max}(x) - y_{min}(x)$$

(where: S represents a flow passage cross-section, wherein a position within the flow passage cross-section S is represented as (x, y), where an x-direction and a y-direction lie in the flow passage cross-section S and are perpendicular to each other and to a normal direction (z-direction);

$v_z$ represents a normal-directional (z-directional) component with respect to the flow passage cross-section S of a flow velocity of the fluid, wherein $v_z(x, y)$ represents a normal-directional component at a position (x, y) of a flow velocity of the fluid at the position (x, y) on the flow passage cross-section S, $V_z(x)$ represents an actual averaged flow velocity along the y-direction at an x-coordinate value, and L(x) represents a length of S in the y-direction at an x-coordinate value; and $y_{min}(x)$ and $y_{max}(x)$ represent, respectively, a minimum value and a maximum value of the y-coordinate when the x-coordinate is fixed on the flow passage cross-section S, wherein $x_{min}$ and $x_{max}$ represent, respectively, a minimum value and a maximum value of the x-coordinate on the flow passage cross-section S), the method comprising:
performing a preliminary experiment, a simulation of the fluid flowing through the passage, or a theoretical calculation based on preliminary data, and estimating a value of a normal-directional component of a flow velocity at each position (x, y) within the flow passage cross-section S;

setting an input value $v_{z0}(x, y)$ based on the estimated value of a normal-directional component of a flow velocity at each position (x, y) within the flow passage cross-section S;

using the set input value $v_{z0}(x, y)$, determining where to place a pair of ultrasonic elements on a flow passage pipe arrangement and parameters for an approximate flow rate of the flow passage defined by the flow passage pipe arrangement, using a weighting function $V'_{z0}(x) L(x)$ represented by, $$V'_{z0}(x)L(x)$$

where $$V'_{z0}(x) = V_{z0}(x) + V_{z1}(x)$$

where $V_{z1}(x)$ is an offset function,
where $$V_{z0}(x) = \frac{\int_{y_{min}(x)}^{y_{max}(x)} dy v_{z0}(x, y)}{y_{max}(x) - y_{min}(x)}$$

where $V_{z0}(x)$ represents an estimated averaged flow velocity along the y-direction at an x-coordinate value, wherein each of locations where to place the pair of ultrasonic elements is represented by a corresponding node $x_i$, and each of the parameters is represented by a coefficient $w_i$ for Gaussian quadrature (where i represents a natural number of 1 to N, where N represents an arbitrary natural number equal to or greater than 1), and wherein the locations determined using the weighting function allow the flow rate to be determined more accurately than locations determined using another weighting function that equals to 1;

placing the pair of ultrasonic elements on the locations determined using the weighting function, the locations being on the flow passage pipe arrangement defining the flow passage;

instructing transmission and receipt of an ultrasonic wave by the pair of ultrasonic elements using an ultrasonic wave transmission and receipt circuit;

recording an ultrasonic wave transmission and receipt-indicative signal indicative of transmission and receipt of the ultrasonic wave using an ultrasonic wave transmission and receipt signal recording circuit;

determining actual averaged flow velocities at the locations of the pair of ultrasonic elements, using a flow velocity calculation circuit, based on the recorded ultrasonic wave transmission and receipt-indicative signal, wherein the determining of the actual averaged flow velocities uses the pair of ultrasonic elements placed at the locations determined using the weighting function, wherein each of the actual averaged flow velocities is along the y-direction and is represented by $V_z(x_i)$ for a corresponding node $x_i$;

for respective nodes $x_i$, determining $V'_{z0}(x_i)$, $V_{z1}(x_i)$, and $Q_{z0}$ and $Q_{z1}$ each represented by a respective one of the following:

$$Q_{z0} = \int_{x_{min}}^{x_{max}} dx V_{z0}(x) L(x)$$

$$Q_{z1} = \int_{x_{min}}^{x_{max}} dx V_{z1}(x) L(x)$$

and determining the approximate flow rate of the flow passage defined by the flow passage pipe arrangement, based on the parameters determined using the weighting function and based on the actual averaged flow velocities and the estimated averaged flow velocities, wherein the actual averaged flow velocities are determined using the pair of ultrasonic elements placed at the locations determined using the weighting function, wherein the approximate flow rate is determined as the flow rate Q, wherein the approximate flow rate is represented by an approximate value $Q_N$ which is represented by the following:

$$Q_N = \frac{\sum_{i=1}^{N} w_i \frac{V_z(x_i)}{V'_{z0}(x_i)}}{1 + \frac{Q_{z1}}{Q_{z0}} - \frac{1}{Q_{z0}} \sum_{i=1}^{N} w_i \frac{V_{z1}(x_i)}{V'_{z0}(x_i)}}.$$

4. The method as defined in claim 3, wherein the $V_{z1}(x)$ is selected to allow $V'_{z0}(x)$ to be always zero or more on the flow passage cross-section S.

5. The method as defined in claim 4, further comprising:
estimating an error range of the approximate value $Q_N$ based on the following Formula using a second approximate value $Q_{SUB}$ that is less reliable than the approximate value $Q_N$:

$$\text{if } Q_{SUB} < Q_N, \frac{Q_{SUB} - Q_N}{2} < Q - Q_N$$

$$\text{if } Q_{SUB} > Q_N, \frac{Q_{SUB} - Q_N}{2} > Q - Q_N.$$

6. The method as defined in claim 3, wherein the $V_{z1}(x)$ is selected to allow $V'_{z0}(x)$ to be always zero or less on the flow passage cross-section S.

7. The method as defined in claim 6, further comprising:
estimating an error range of the approximate value $Q_N$ based on the following Formula using a second approximate value $Q_{SUB}$ that is less reliable than the approximate value $Q_N$:

$$\text{if } Q_{SUB} < Q_N, \frac{Q_{SUB} - Q_N}{2} < Q - Q_N$$

$$\text{if } Q_{SUB} > Q_N, \frac{Q_{SUB} - Q_N}{2} > Q - Q_N.$$

8. The method as defined in claim 3, further comprising:
estimating an error range of the approximate value $Q_N$ based on the following Formula using a second approximate value $Q_{SUB}$ that is less reliable than the approximate value $Q_N$:

if $Q_{SUB} < Q_N$, $\dfrac{Q_{SUB} - Q_N}{2} < Q - Q_N$ if $Q_{SUB} > Q_N$, $\dfrac{Q_{SUB} - Q_N}{2} > Q - Q_N$.

9. An apparatus for measuring a flow rate Q of a fluid flowing through a flow passage, wherein the flow rate Q is represented by the following:

$$Q = \int_S ds v_z$$
$$= \int_{x_{min}}^{x_{max}} dx \int_{y_{min}(x)}^{y_{max}(x)} dy v_z(x, y)$$
$$= \int_{x_{min}}^{x_{max}} dx V_z(x) L(x)$$

where, $$V_z(x) = \dfrac{\int_{y_{min}(x)}^{y_{max}(x)} dy v_z(x, y)}{y_{max}(x) - y_{min}(x)}$$

$$L(x) = y_{max}(x) - y_{min}(x)$$

(where: S represents a flow passage cross-section, wherein a position within the flow passage cross-section S is represented as (x, y), where an x-direction and a y-direction lie in the flow passage cross-section S and are perpendicular to each other and to a normal direction (z-direction);

$v_z$ represents a normal-directional (z-directional) component with respect to the flow passage cross-section S of a flow velocity of the fluid, wherein $v_z(x, y)$ represents a normal-directional component at a position (x, y) of a flow velocity of the fluid at the position (x, y) on the flow passage cross-section S, $V_z(x)$ represents an actual averaged flow velocity along the y-direction at an x-coordinate value, and L(x) represents a length of S in the y-direction at an x-coordinate value; and $y_{min}(x)$ and $y_{max}(x)$ represent, respectively, a minimum value and a maximum value of the y-coordinate when the x-coordinate is fixed on the flow passage cross-section S, wherein $x_{min}$ and $x_{max}$ represent, respectively, a minimum value and a maximum value of the x-coordinate on the flow passage cross-section S), the apparatus comprising:

a Gaussian quadrature operation section for setting $v_{z0}(x, y)$ which represents an estimate value of a normal-directional component of a flow velocity at each position (x, y) within the flow passage cross-section S, the estimate value of $v_{z0}(x, y)$ being determined by performing a preliminary experiment, a simulation of the fluid flowing through the passage, or a theoretical calculation based on preliminary data; and a pair of ultrasonic elements on a flow passage pipe arrangement each placed at independent locations in the flow passage cross-section, the independent locations and parameters for an approximate flow rate of the flow passage defined by the flow passage pipe arrangement being determined using a weighting function $V_{z0}(x) L(x)$ represented by, $V_{z0}(x)L(x)$ where, $$V_{z0}(x) = \dfrac{\int_{y_{min}(x)}^{y_{max}(x)} dy v_{z0}(x, y)}{y_{max}(x) - y_{min}(x)}$$

where $V_{z0}(x)$ represents an estimated averaged flow velocity along the y-direction at an x-coordinate value, wherein each of the independent locations for the pair of ultrasonic elements is represented by a corresponding node $x_i$, and each of the parameters is represented by a coefficient $w_i$ for Gaussian quadrature (where i represents a natural number of 1 to N, where N represents an arbitrary natural number equal to or greater than 1), and wherein the locations determined using the weighting function allow the flow rate to be determined more accurately than locations determined using another weighting function that equals to 1;

a $V_z(x_i)$ determining section for determining $V_z(x_i)$ for respective nodes $x_i$ determined by the Gaussian quadrature operation section, the $V_z(x_i)$ determining section comprising:

the pair of ultrasonic elements placed on the locations determined using the weighting function, the locations being on the flow passage pipe arrangement defining the flow passage;

an ultrasonic wave transmission and receipt circuit for giving an instruction of transmission and receipt of an ultrasonic wave to the pair of ultrasonic elements;

an ultrasonic wave transmission and receipt signal recording circuit for recording an ultrasonic wave transmission and receipt-indicative signal indicative of transmission and receipt of the ultrasonic wave;

a flow velocity calculation circuit for determining actual averaged flow velocities at the locations of the pair of ultrasonic elements using the ultrasonic wave transmission and receipt-indicative signal recorded on the ultrasonic wave transmission and receipt signal recording circuit, wherein the flow velocity calculation circuit is configured to determine the actual averaged flow velocities using the pair of ultrasonic elements placed at the locations determined using the weighting function, wherein each of the actual averaged flow velocities is along the y-direction and is represented by $V_z(x_i)$ for a corresponding node $x_i$;

a $V_{z0}(x_i)$ determining section for determining estimated averaged flow velocities at the locations of the pair of ultrasonic elements determined using the weighting function, wherein each of the estimated averaged flow velocities is along the y-direction and is represented by $V_{z0}(x_i)$ for a corresponding node $x_i$ determined by the Gaussian quadrature operation section; and a $Q_N$ determining section for determining the approximate flow rate of the flow passage defined by the flow passage pipe arrangement, based on the parameters determined using the weighting function and based on the actual averaged flow velocities and the estimated averaged flow velocities, wherein the actual averaged flow velocities are determined using the pair of ultrasonic elements placed at the locations determined using the weighting function, wherein the approximate flow rate is determined as the flow rate Q, wherein the approximate flow rate is represented by an approximate value $Q_N$ which is represented by the following:

$$Q_N = \sum_{i=1}^{N} w_i \frac{V_z(x_i)}{V_{z0}(x_i)}.$$

10. The apparatus as defined in claim 9, further comprising an error range estimating section configured to estimate an error range of the approximate value $Q_N$ based on the following Formula using a second approximate value $Q_{SUB}$ that is less reliable than the approximate value $Q_N$:

if $Q_{SUB} < Q_N$, $\frac{Q_{SUB} - Q_N}{2} < Q - Q_N$ if $Q_{SUB} > Q_N$, $\frac{Q_{SUB} - Q_N}{2} > Q - Q_N$.

11. An apparatus for measuring a flow rate Q of a fluid flowing through a flow passage, wherein the flow rate Q is represented by the following:

$$Q = \int_S ds v_z$$
$$= \int_{x_{min}}^{x_{max}} dx \int_{y_{min}(x)}^{y_{max}(x)} dy v_z(x, y)$$
$$= \int_{x_{min}}^{x_{max}} dx V_z(x) L(x)$$

where, $$V_z(x) = \frac{\int_{y_{min}(x)}^{y_{max}(x)} dy v_z(x, y)}{y_{max}(x) - y_{min}(x)}$$

$$L(x) = y_{max}(x) - y_{min}(x)$$

(where: S represents a flow passage cross-section, wherein a position within the flow passage cross-section S is represented as (x, y), where an x-direction and a y-direction lie in the flow passage cross-section S and are perpendicular to each other and to a normal direction (z-direction);

$v_z$ represents a normal-directional (z-directional) component with respect to the flow passage cross-section S of a flow velocity of the fluid, wherein $v_z(x, y)$ represents a normal-directional component at a position (x, y) of a flow velocity of the fluid at the position (x, y) on the flow passage cross-section S, $V_z(x)$ represents an actual averaged flow velocity along the y-direction at an x-coordinate value, and L(x) represents a length of S in the y-direction at an x-coordinate value; and $y_{min}(x)$ and $y_{max}(x)$ represent, respectively, a minimum value and a maximum value of the y-coordinate when the x-coordinate is fixed on the flow passage cross-section S, wherein $x_{min}$ and $x_{max}$ represent, respectively, a minimum value and a maximum value of the x-coordinate on the flow passage cross-section S), the apparatus comprising:

a Gaussian quadrature operation section for setting $v_{z0}(x, y)$ which represents an estimate value of a normal-directional component of a flow velocity at each position (x, y) within the flow passage cross-section S, the estimate value of $v_{z0}(x, y)$ being determined by performing a preliminary experiment, a simulation of the fluid flowing through the passage, or a theoretical calculation based on preliminary data; and a pair of ultrasonic elements on a flow passage pipe arrangement each placed at independent locations in the flow passage cross-section, the independent locations and parameters for an approximate flow rate of the flow passage defined by the flow passage pipe arrangement, using a weighting function $V'_{z0}(x) L(x)$ represented by, $$V'_{z0}(x)L(x)$$

where $$V'_{z0}(x) = V_{z0}(x) + V_{z1}(x)$$

where $V_{z1}(x)$ is an offset function,
where $$V_{z0}(x) = \frac{\int_{y_{min}(x)}^{y_{max}(x)} dy v_{z0}(x, y)}{y_{max}(x) - y_{min}(x)}$$

where $V_{z0}(x)$ represents an estimated averaged flow velocity along the y-direction at an x-coordinate value, wherein each of the independent locations for the pair of ultrasonic elements is represented by a corresponding node $x_i$, and each of the parameters is represented by a coefficient $w_i$ for Gaussian quadrature (where i represents a natural number of 1 to N, where N represents an arbitrary natural number equal to or greater than 1), and wherein the locations determined using the weighting function allow the flow rate to be determined more accurately than locations determined using another weighting function that equals to 1;

a $V_z(x_i)$ determining section for determining $V_z(x_i)$ for each node $x_i$ determined by the Gaussian quadrature operation section, the $V_z(x_i)$ determining section comprising:

the pair of ultrasonic elements placed on the locations determined using the weighting function, the locations being on the flow passage pipe arrangement defining the flow passage;

an ultrasonic wave transmission and receipt circuit for giving an instruction of transmission and receipt of an ultrasonic wave to the pair of ultrasonic elements;

an ultrasonic wave transmission and receipt signal recording circuit for recording an ultrasonic wave transmission and receipt-indicative signal indicative of transmission and receipt of the ultrasonic wave;

a flow velocity calculation circuit for determining actual averaged flow velocities at the locations of the pair of ultrasonic elements using the ultrasonic wave transmission and receipt-indicative signal recorded on the ultrasonic wave transmission and receipt signal recording circuit, wherein the flow velocity calculation circuit is configured to determine the actual averaged flow velocities using the pair of ultrasonic elements placed at the locations determined using the weighting function, wherein each of the actual averaged flow velocities is along the y-direction and is represented by $V_z(x_i)$ for a corresponding node $x_i$;

a $V'_{z0}(x_i)$, $V_{z1}(x_i)$, and $Q_{z0}$, $Q_{z1}$ determining section for determining $V_{z0}(x_i)$, $V_{z1}(x_i)$ for respective nodes $x_i$ determined by the Gaussian quadrature operation section, and $Q_{z0}$ and $Q_{z1}$ each represented by a respective one of the following:

$$Q_{z0} = \int_{x_{min}}^{x_{max}} dx V_{z0}(x) L(x)$$

$$Q_{z1} = \int_{x_{min}}^{x_{max}} dx V_{z1}(x) L(x)$$

and
a $Q_N$ determining section for determining the approximate flow rate of the flow passage defined by the flow passage pipe arrangement, based on the parameters determined using the weighting function and based on the actual averaged flow velocities and the estimated averaged flow velocities, wherein the actual averaged flow velocities are determined using the pair of ultrasonic elements placed at the locations determined using the weighting function, wherein the approximate flow rate is determined as the flow rate Q, wherein the approximate flow rate is represented by an approximate value $Q_N$ which is represented by the following:

$$Q_N = \frac{\sum_{i=1}^{N} w_i \frac{V_z(x_i)}{V'_{z0}(x_i)}}{1 + \frac{Q_{z1}}{Q_{z0}} - \frac{1}{Q_{z0}} \sum_{i=1}^{N} w_i \frac{V_{z1}(x_i)}{V'_{z0}(x_i)}}.$$

12. The apparatus as defined in claim 11, wherein the Gaussian quadrature operation section is configured to use the $V_{z1}(x)$ selected to allow $V'_{z0}(x)$ to be always zero or more on the flow passage cross-section S.

13. The apparatus as defined in claim 12, further comprising an error range estimating section configured to estimate an error range of the approximate value $Q_N$ based on the following Formula using a second approximate value $Q_{SUB}$ that is less reliable than the approximate value $Q_N$:

$$\text{if } Q_{SUB} < Q_N, \frac{Q_{SUB} - Q_N}{2} < Q - Q_N$$

$$\text{if } Q_{SUB} > Q_N, \frac{Q_{SUB} - Q_N}{2} > Q - Q_N.$$

14. The apparatus as defined in claim 11, wherein the Gaussian quadrature operation section is configured to use the $V_{z1}(x)$ selected to allow $V'_{z0}(x)$ to be always zero or less on the flow passage cross-section S.

15. The apparatus as defined in claim 14, further comprising an error range estimating section configured to estimate an error range of the approximate value $Q_N$ based on the following Formula using a second approximate value $Q_{SUB}$ that is less reliable than the approximate value $Q_N$:

$$\text{if } Q_{SUB} < Q_N, \frac{Q_{SUB} - Q_N}{2} < Q - Q_N$$

$$\text{if } Q_{SUB} > Q_N, \frac{Q_{SUB} - Q_N}{2} > Q - Q_N.$$

16. The apparatus as defined in claim 11, further comprising an error range estimating section configured to estimate an error range of the approximate value $Q_N$ based on the following Formula using a second approximate value $Q_{SUB}$ that is less reliable than the approximate value $Q_N$:

$$\text{if } Q_{SUB} < Q_N, \frac{Q_{SUB} - Q_N}{2} < Q - Q_N$$

$$\text{if } Q_{SUB} > Q_N, \frac{Q_{SUB} - Q_N}{2} > Q - Q_N.$$

* * * * *